(12) United States Patent
Alshehri et al.

(10) Patent No.: US 12,294,219 B2
(45) Date of Patent: May 6, 2025

(54) BATTERY ENERGY STORAGE-BASED CONTROLLER FOR IMPROVING MICROGRID POWER QUALITY

(71) Applicant: KING FAHD UNIVERSITY OF PETROLEUM AND MINERALS, Dhahran (SA)

(72) Inventors: Jaber Ali Alshehri, Dhahran (SA); Muhammad Khalid, Dhahran (SA); Ahmed Hussain Alzahrani, Dhahran (SA)

(73) Assignees: KING FAHD UNIVERSITY OF PETROLEUM AND MINERALS, Dhahran (SA); King Abdullah City for Atomic & Renewable Energy (K.A. CARE), Riyadh (SA)

(*) Notice: Subject to any disclaimer, the term of this patent is extended or adjusted under 35 U.S.C. 154(b) by 423 days.

(21) Appl. No.: 17/199,647

(22) Filed: Mar. 12, 2021

(65) Prior Publication Data

US 2021/0296902 A1    Sep. 23, 2021

Related U.S. Application Data

(60) Provisional application No. 62/990,723, filed on Mar. 17, 2020.

(51) Int. Cl.
*H02J 3/32*    (2006.01)
*G05B 6/02*    (2006.01)
(Continued)

(52) U.S. Cl.
CPC .............. *H02J 3/32* (2013.01); *G05B 6/02* (2013.01); *G05B 13/027* (2013.01); *H02J 3/381* (2013.01);
(Continued)

(58) Field of Classification Search
CPC .......... H02J 3/32; H02J 3/381; H02J 2203/20; H02J 2300/10; H02J 2300/24; G05B 6/02;
(Continued)

(56) References Cited

U.S. PATENT DOCUMENTS 10,826,322 B2 *  11/2020  Colombi .............. H02J 9/061
2008/0197706 A1 *  8/2008  Nielsen .............. H02M 7/487
363/67
(Continued)

FOREIGN PATENT DOCUMENTS

CN    105024390     * 11/2015 ............. Y02E 40/10
CN    104778497 B     9/2017
(Continued)

OTHER PUBLICATIONS

Habibi et al, "Designing a Self-Tuning Frequency Controller Using ANN for an Isolated Microgrid", 2012, pp. 7, downloaded from https://www.researchgate.net/profile/Shoresh-Shokoohi/publication/342094836_Designing_a_Self-Tuning_Frequency_Controller_Using_ANN_for_an_Isolated_Microgrid/links (Year: 2012).*
(Continued)

*Primary Examiner* — Darrin D Dunn
*Assistant Examiner* — Olvin Lopez Alvarez
(74) *Attorney, Agent, or Firm* — Oblon, McClelland, Maier & Neustadt, L.L.P.

(57) ABSTRACT

A microgrid system includes a synchronous generator configured to convert mechanical power into electric power, an energy storage system configured to store and supply electric power, a controller configured to control operation of the energy storage system; and a point of common coupling bus connecting the synchronous generator and the battery energy storage system, wherein a controller parameter of the controller is determined based on a level of a disturbance using
(Continued)

a trained artificial neural network in response to occurrence of the disturbance in the synchronous generator.

13 Claims, 16 Drawing Sheets

(51) Int. Cl.
  *G05B 13/02* (2006.01)
  *H02J 3/38* (2006.01)
(52) U.S. Cl.
  CPC ....... *H02J 2203/20* (2020.01); *H02J 2300/10* (2020.01); *H02J 2300/24* (2020.01)
(58) Field of Classification Search
  CPC ....... G05B 13/027; Y02E 40/10; Y02E 60/00; Y02E 10/56; Y04S 40/20
  See application file for complete search history.

(56) References Cited

U.S. PATENT DOCUMENTS

| | | | | |
|---|---|---|---|---|
| 2012/0215368 A1* | 8/2012 | Sharma | ...................... | H02J 3/32 700/297 |
| 2012/0280569 A1* | 11/2012 | Alam | ........................ | H02J 3/32 307/60 |
| 2018/0373986 A1* | 12/2018 | Rainwater | ............... | G06F 11/36 |

FOREIGN PATENT DOCUMENTS

| | | |
|---|---|---|
| CN | 106849189 B | 6/2019 |
| CN | 109960860 A | 7/2019 |

OTHER PUBLICATIONS

Lu et al, "The PID Controller Based on the Artificial Neural Network and the Differential Evolution Algorithm", 2012, pp. 2368-2375, downloaded from https://citeseerx.ist.psu.edu/document?repid=rep1&type=pdf&doi=d936aaf9533cb43d3328e6397a7db74c832c14c8#page=22 (Year: 2012).*
Sibi et al, "Analysis of Different Activation Functions Using Back Propagation Neural Networks", 2013, pp. 1264-1268, downloaded from http://www.jatit.org/volumes/Vol47No3/61Vol47No3.pdf (Year: 2013).*
Queguiner, "what does Training Neural Networks mean?", pp. 7, 2020 downloaded from https://blog.ovhcloud.com/what-does-training-neural-networks-mean/ (Year: 2020).*
Wikipedia, "Mathematical optimization", pp. 8, 2023 downloaded from https://en.wikipedia.org/wiki/Mathematical_optimization (Year: 2023).*
Jaber Alshehri, et al., "An Intelligent Battery Energy Storage-Based Controller for Power Quality Improvement in Microgrids", Energies, vol. 12, No. 11, Jun. 2019, pp. 1-21.
Jaber Alshehri, et al., "Power Quality Improvement in Microgrids Under Critical Disturbances Using an Intelligent Decoupled Control Strategy Based on Battery Energy Storage System", IEEE Access, vol. 7, Oct. 8, 2019, pp. 147314-147326.
H. Vahedi, et al., "Optimal Management of MicroGrid Using Differential Evolution Approach", 2010 7th International Conference on the European Energy Market, Jun. 23-25, 2010, 6 pages.
Lj Miranda, "Training a neural network using differential evolution", https://ljvmiranda921.github.io/notebook/2017/01/17/de-trained-neural-network-for-solving-the-two-spiral-problem/, Jan. 17, 2017, 8 pages.

* cited by examiner

BATTERY ENERGY STORAGE-BASED CONTROLLER FOR IMPROVING MICROGRID POWER QUALITY

CROSS-REFERENCE TO RELATED APPLICATIONS

This application is based on, and claims the benefit of priority to, provisional application No. 62/990,723, filed Mar. 17, 2020, the entire contents of which are incorporated herein by reference.

PRIOR DISCLOSURE BY AN INVENTOR

Aspects of the present disclosure were described in an article titled "An Intelligent Battery Energy Storage-Based Controller for Power Quality Improvement in Microgrids," in *Energies* 2019, 12 (11), 2112, which is incorporated herein by reference in its entirety.

BACKGROUND

Technical Field

The present disclosure relates to a microgrid system including a synchronous generator, a photovoltaic power system, an energy storage system, and a controller for controlling operation of the energy storage system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Electric power systems have transformed significantly since distributed energy resources (DER), particularly renewable energy sources (RES), began appearing in distribution networks. Many reasons related to environmental issues, governmental policies and economic aspects have motivated the increased use of RES, such as photovoltaic systems (PV), wind turbines (WT) and small hydropower turbines (HT) as described in T. S. Ustun, C. Ozansoy, and A. Zayegh, "Recent developments in microgrids and example cases around the world—A review," *Renewable Sustainable Energy Reviews*, vol. 15, no. 8, pp. 4030-4041, 2011, the entire contents of which is incorporated herein by reference.

The conventional radial distribution networks in various countries suffer from efficiency, quality and reliability issues. The microgrid (MG) concept is then introduced as a potential candidate solution for the aforesaid conventional distribution network weaknesses as described in S. M. Kaviri, M. Pahlevani, P. Jain, and A. Bakhshai, "A review of AC microgrid control methods," in *the 8th International Symposium on Power Electronics for Distributed Generation Systems (PEDG)*, 2017, pp. 1-8: IEEE, and M. Khalid, U. Akram, and S. Shafiq, "Optimal Planning of Multiple Distributed Generating Units and Storage in Active Distribution Networks," *IEEE Access*, 2018, the entire contents of which are incorporated herein by reference.

MG systems are small-scale electrical power systems that include distributed generation (DGs), energy storage devices (ESDs) and loads as described in H. Jiayi, J. Chuanwen, and X. Rong, "A review on distributed energy resources and MicroGrid," *Renewable Sustainable Energy Reviews*, vol. 12, no. 9, pp. 2472-2483, 2008, M. S. Mahmoud, S. A. Hussain, and M. A. Abido, "Modeling and control of microgrid: An overview," *Journal of the Franklin Institute*, vol. 351, no. 5, pp. 2822-2859, 2014, and P. Basak, S. Chowdhury, S. H. nee Dey, and S. Chowdhury, "A literature review on integration of distributed energy resources in the perspective of control, protection and stability of microgrid," *Renewable Sustainable Energy Reviews*, vol. 16, no. 8, pp. 5545-5556, 2012, the entire contents of which are incorporated herein by reference.

DGs typically refer to small-scale power generations that are located close to load centers as described in N. Lidula and A. Rajapakse, "Microgrids research: A review of experimental microgrids and test systems," *Renewable Sustainable Energy Reviews*, vol. 15, no. 1, pp. 186-202, 2011, the entire contents of which is incorporated herein by reference.

Generally, DGs can be classified into two main categories depending on the type of connection with the grid. The first category is inertial type DGs such as gas turbines (GT), internal combustion engines (ICE) and micro alternators which include inertial machines, and the second category is inverter type DGs such as PV systems, WT systems, and fuel cell (FC) systems which require power electronic devices, as described in I. Vechiu, O. Curea, A. Llaria, and H. Camblong, "Control of power converters for microgrids," COMPEL, vol. 30, no. 1, pp. 300-309, 2011, M. N. Marwali, J.-W. Jung, and A. Keyhani, "Control of distributed generation systems-Part II: Load sharing control," *IEEE Transactions on power electronics*, vol. 19, no. 6, pp. 1551-1561, 2004, J. M. Carrasco et al., "Power-electronic systems for the grid integration of renewable energy sources: A survey," *IEEE Transactions on industrial electronics*, vol. 53, no. 4, pp. 1002-1016, 2006, F. Blaabjerg, Z. Chen, and S. B. Kjaer, "Power electronics as efficient interface in dispersed power generation systems," *IEEE transactions on power electronics*, vol. 19, no. 5, pp. 1184-1194, 2004, and F. Katiraei, M. R. Iravani, and P. W. Lehn, "Micro-grid autonomous operation during and subsequent to islanding process," *IEEE Transactions on power delivery*, vol. 20, no. 1, pp. 248-257, 2005, the entire contents of which are incorporated herein by reference.

ESDs are very important components of MGs and needed to balance energy when a system disturbance occurs as described in A. G. Tsikalakis and N. D. Hatziargyriou, "Centralized control for optimizing microgrids operation," in *Power and Energy Society General Meeting*, 2011, pp. 1-8: IEEE, the entire contents of which is incorporated herein by reference. Several energy storage system (ESS) technologies have been employed for MG applications such as battery energy storage systems (BESS), super-capacitor energy storage systems (SCESS), superconducting magnetic energy storage systems (SMES) and flywheel energy storage systems (FESS) as described in R. Zamora and A. Srivastava, "Controls for microgrids with storage: Review, challenges, and research needs," *Renewable Sustainable Energy Reviews*, vol. 14, no. 7, pp. 2009-2018, 2010, P. F. Ribeiro, B. K. Johnson, M. L. Crow, A. Arsoy, and Y. Liu, "Energy storage systems for advanced power applications," *Proceedings of the IEEE*, vol. 89, no. 12, pp. 1744-1756, 2001, and U. Akram and M. Khalid, "A Coordinated Frequency Regulation Framework Based on Hybrid Battery-Ultracapacitor Energy Storage Technologies," *IEEE Access*, vol. 6, pp. 7310-7320, 2018, the entire contents of which are incorporated by reference, the entire contents of which are incorporated herein by reference.

MGs offer several advantages such as lower financial responsibility compared to bulk power generation and utilizing environmentally friendly RES. Moreover, MGs enhance the reliability of the distribution networks since loads become less sensitive to transmission network interruptions. In short, valuable goals such as reliability, lower carbon emission, and cost saving can be achieved with the deployment of MG systems.

On the other hand, MGs still face some regulatory and technical challenges. The regulatory challenges include an uncompetitive electricity market, regulated government pricing, and landscape requirements. Technical challenges include power quality, protection relaying coordination, and dynamic system stability issues as described in P. Basak, S. Chowdhury, S. H. nee Dey, and S. Chowdhury, "A literature review on integration of distributed energy resources in the perspective of control, protection and stability of microgrid," *Renewable Sustainable Energy Reviews*, vol. 16, no. 8, pp. 5545-5556, 2012, the entire contents of which is incorporated herein by reference.

Most recently, MGs have attracted global interest due to the aforementioned advantages. Many researches, as well as real projects, have been conducted to implement different kinds of MG systems. For instance, the MG projects in China as described in B. Zhao, J. Chen, L. Zhang, X. Zhang, R. Qin, and X. Lin, "Three representative island microgrids in the East China Sea: Key technologies and experiences," Renewable Sustainable Energy Reviews, vol. 96, pp. 262-274, 2018, the entire contents of which is incorporated herein by reference, the MG project in Venezuela as described in A. López-González, B. Domenech, and L. Ferrer-Martí, "Sustainability and design assessment of rural hybrid microgrids in Venezuela," Energy, vol. 159, pp. 229-242, 2018, the entire contents of which is incorporated herein by reference, the Federal University of Rio de Janeiro MG in Brazil as described in M. H. Bellido, L. P. Rosa, A. O. Pereira, D. M. Falcão, and S. K. Ribeiro, "Barriers, challenges and opportunities for microgrid implementation: The case of Federal University of Rio de Janeiro," *Journal of Cleaner Production*, vol. 188, pp. 203-216, 2018, the entire contents of which is incorporated herein by reference, and several projects in the United States as described in W. Feng et al., "A review of microgrid development in the United States—A decade of progress on policies, demonstrations, controls, and software tools," *Applied Energy*, vol. 228, pp. 1656-1668, 2018, the entire contents of which is incorporated herein by reference, have been conducted.

MGs can be operated on either grid-connected mode or islanded operation mode as described in T. Green and M. Prodanović, "Control of inverter-based micro-grids," *Electric Power Systems Research*, vol. 77, no. 9, pp. 1204-1213, 2007, the entire contents of which is incorporated herein by reference. The operation and control requirements vary based on the operating mode and the controlled components such as loads, storage units and DGs as described in M. Kumar and B. Tyagi, "A state of art review of microgrid control and integration aspects," in the 7th *India International Conference on Power Electronics (IICPE)*, Patiala, India, 2016, pp. 1-6: IEEE, the entire contents of which is incorporated herein by reference. The deployment of MGs along with the conventional power network requires appropriate control techniques. In the literature, there are mainly two popular control architectures, which are centralized and decentralized control. In centralized control, the whole system is being handled by a central control unit that shares data and information with a distribution control system through communication channels as described in S. Parhizi, H. Lotfi, A. Khodaei, and S. Bahramirad, "State of the Art in Research on Microgrids: A Review," *IEEE Access*, vol. 3, no. 1, pp. 890-925, 2015, the entire contents of which is incorporated herein by reference.

The study in H. Bevrani, F. Habibi, P. Babahajyani, M. Watanabe, and Y. Mitani, "Intelligent frequency control in an AC microgrid: Online PSO-based fuzzy tuning approach," *IEEE transactions on smart grid*, vol. 3, no. 4, pp. 1935-1944, 2012, the entire contents of which is incorporated herein by reference, presents a MG central controller using an intelligent PSO-fuzzy proportional-integral (PI) control methodology. The PI controller parameters are tuned automatically according to the online measurements using fuzzy logic (FL) rules. The FL membership functions' parameters are optimized online using the particle swarm optimization (PSO) technique. To verify the proposed controller performance, the results were compared with a classical PI controller as well as a pure fuzzy PI controller. The intelligent PSO-fuzzy PI control methodology showed better performance in terms of frequency restoration (FR) when compared to the classical and pure fuzzy PI controllers.

In decentralized control, each component of the MG system is equipped with a dedicated controller as described in K. Rajesh, S. Dash, R. Rajagopal, and R. Sridhar, "A review on control of ac microgrid," *Renewable Sustainable Energy Reviews*, vol. 71, pp. 814-819, 2017, the entire contents of which is incorporated herein by reference. In Z. Zhang, C. Dou, D. Yue, B. Zhang, and W. Luo, "A Decentralized Control Method for Frequency Restoration and Accurate Reactive Power Sharing in Islanded Microgrids," *Journal of the Franklin Institute*, 2018, the entire contents of which is incorporated herein by reference, a decentralized control approach for FR and reactive power sharing (RPS) in autonomous MGs is proposed. Line voltage drop compensation was used in order to improve the voltage droop coefficient which finally changes the frequency reference and improves the power-frequency droop control. In order to guarantee an accurate RPS, an output voltage feedback control is introduced, a rare technique in voltage droop control.

Furthermore, a decentralized control methodology for bidirectional power converters in hybrid AC/DC MG was proposed in P. Yang, Y. Xia, M. Yu, W. Wei, and Y. Peng, "A Decentralized Coordination Control Method for Parallel Bidirectional Power Converters in a Hybrid AC-DC Microgrid," *IEEE Transactions on Industrial Electronics*, vol. 65, no. 8, pp. 6217-6228, 2018, the entire contents of which are incorporated herein by reference. The main objective of the control method was to achieve overall power-sharing in grid-connected and autonomous mode. In order to provide enough voltage support during islanded mode, an energy storage system was utilized in the DC sub-grid of the hybrid AC/DC MG system. The performance of the proposed control strategy was verified by real-time hardware-in-loop (HIL) tests.

ESDs are widely used to improve power quality and enhance the stability of MG systems in both grid-connected and islanded mode. Several energy storage-based control strategies have been proposed in M. Faisal, M. Hannan, P. J. Ker, A. Hussain, M. Mansur, and F. Blaabjerg, "Review of energy storage system technologies in microgrid applications: Issues and challenges," *IEEE Access*, 2018, and U. Akram, M. Khalid, and S. Shafiq, "An innovative hybrid wind-solar and battery-supercapacitor microgrid system-Development and optimization," *IEEE Access*, vol. 5, pp. 25897-25912, 2017, the entire contents of which are incorporated herein by reference.

In G. Parise, L. Martirano, M. Kermani, and M. Kermani, "Designing a power control strategy in a microgrid using PID/fuzzy controller based on battery energy storage," in *the International Conference on Environment and Electrical Engineering and Industrial and Commercial Power Systems Europe (EEEIC/I&CPS Europe)*, Milan, Italy, 2017, pp. 1-5: IEEE, the entire contents of which is incorporated herein by reference, a technique to control a MG system using a PID/fuzzy controller based on a BESS is proposed. The controller showed better dynamic response when compared to a classical PID controller.

Similarly, in M. Kermani, "Transient voltage and frequency stability of an isolated microgrid based on energy storage systems," in *the 16th International Conference on Environment and Electrical Engineering (EEEIC)*, Florence, Italy, 2016, pp. 1-5: IEEE, the entire contents of which is incorporated herein by reference, a BESS-based controller was was used to improve the MG power quality by restoring the system voltage and frequency during transients. Two abnormal conditions were considered in designing the controller: sudden load changes and fault occurrence.

However, the performance of the above two energy storage-based controllers was not satisfactory. In H. Li, X. Wang, and J. Xiao, "Differential Evolution-Based Load Frequency Robust Control for Micro-Grids with Energy Storage Systems," Energies, vol. 11, no. 7, p. 1686, 2018, the entire contents of which is incorporated herein by reference, a robust control approach based on structural singular value theory has been employed in order to design the MG frequency controller. The SCESS based controller gains were optimized using differential evolution optimization (DEO) techniques. The control method was shown to have good robustness in restoring MG frequency following transients, but did not improve MG system voltage as well.

Likewise, in M. A. Ali, "Control of a Microgrid Through Energy Storage Devices Using Evolutionary and Neuro-Fuzzy Methods," Master Thesis, King Fahd University of Petroleum and Minerals Dhahran, Saudi Arabia, 2013, the entire contents of which is incorporated herein by reference, a decoupled active and reactive power control strategy based on BESS and SCESS has been proposed to restore the system frequency and voltage of the MG system during contingencies. The MG system has been modeled to include conventional microgeneration, PV system, FC system, and WT system. An adaptive online neuro-fuzzy algorithm was adapted to tune the energy storage-based PI controller gains.

Other modern control strategies have been proposed to the enhance dynamic system response under abnormal conditions, as described in C. Fu and W. Tan, "Decentralised load frequency control for power systems with communication delays via active disturbance rejection," *IET Generation, Transmission Distribution*, vol. 12, no. 6, pp. 1397-1403, 2017, M. Ma, C. Zhang, X. Liu, and H. Chen, "Distributed Model Predictive Load Frequency Control of the Multi-Area Power System After Deregulation," *IEEE Transactions on Industrial Electronics*, vol. 64, no. 6, pp. 5129-5139, 2017, R. Shankar, K. Chatterjee, and R. Bhushan, "Impact of energy storage system on load frequency control for diverse sources of interconnected power system in deregulated power environment," *International Journal of Electrical Power Energy Systems*, vol. 79, pp. 11-26, 2016, C. Mu, Y. Tang, and H. He, "Improved sliding mode design for load frequency control of power system integrated an adaptive learning strategy," *IEEE Transactions on Industrial Electronics*, vol. 64, no. 8, pp. 6742-6751, 2017, and G. Rinaldi, M. Cucuzzella, and A. Ferrara, "Third order sliding mode observer-based approach for distributed optimal load frequency control," *IEEE Control Systems Letters*, vol. 1, no. 2, pp. 215-220, 2017, the entire contents of which are incorporated herein by reference.

These conventional control strategies showed effective dynamic performance, however, they did not contribute significantly to MG power quality improvement and required complex calculations and long processes. As mentioned earlier, one of the major technical concerns in MG applications is to improve the power quality of the system subjected to a disturbance; particularly the problem sometimes becomes very challenging in case of unknown disturbances of significantly higher magnitude due to reasons such as a sudden loss of power generation, short circuits, and/o sudden load changes.

SUMMARY

In an exemplary embodiment, a microgrid system includes a synchronous generator configured to convert mechanical power into electric power, an energy storage system configured to store and supply electric power, a controller configured to control operation of the energy storage system, and a point of common coupling bus connecting the synchronous generator and the battery energy storage system, wherein a controller parameter of the controller is determined based on a level of a disturbance using a trained artificial neural network (ANN) in response to occurrence of the disturbance in the synchronous generator.

In another exemplary embodiment, a controller is provided for controlling operation of a battery energy storage system included in a microgrid system including a diesel synchronous generator. The controller includes a proportional-integral (PI) controller configured to control the battery energy storage system in such a manner as to minimize a mismatch between a system frequency of the microgrid system and a preset reference frequency and a hybrid DEO-ANN unit configured to obtain a trained ANN and determine a controller parameter of the PI controller based on a level of a disturbance using the trained ANN in response to occurrence of the disturbance in the diesel synchronous generator.

In still another exemplary embodiment, a method is provided for controlling operation of a battery energy storage system using a PI controller, the battery energy storage system being included in a microgrid system including a diesel synchronous generator. The method includes: acquiring a mathematical model representing the microgrid system; applying a plurality of levels of disturbances to a part of the mathematical model corresponding to a mechanical part of the diesel synchronous generator; optimizing, for each level of disturbance, a controller parameter of the PI controller using differential evolution optimization in such a manner as to restore a system frequency and a system voltage of the microgrid system to preset normal operating limits; training an ANN using the plurality of levels of disturbances as input and a plurality of optimized controller parameters as output, each level of disturbance corresponding to each optimized controller parameter; and determining a value of the controller parameter based on a level of a disturbance using a trained ANN in response to occurrence of the disturbance in the diesel synchronous generator.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
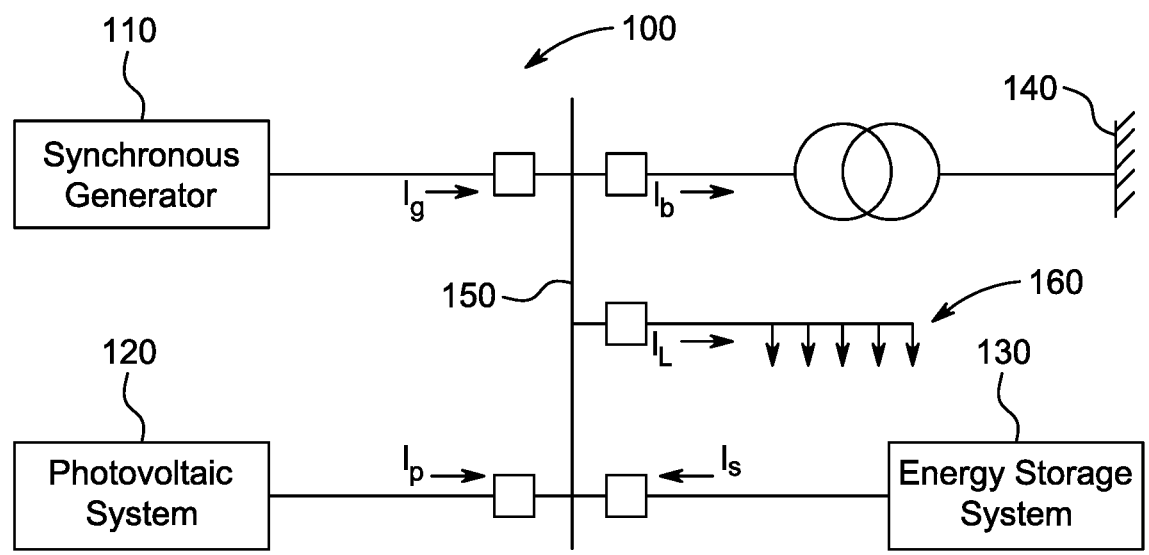
FIG. 1 is a schematic single line diagram of a microgrid system, according to certain embodiments.

Aspects of the present disclosure are directed to a control approach that provides improved power quality in a microgrid (MG) system including a synchronous generator, a photovoltaic system, an energy storage system, and a controller for controlling operation of the energy storage system. This control approach promptly restores the MG system to its initial steady state condition in case of contingencies and/or disruptions. The present disclosure describes the behavior of the MG system under transients and provides an innovative intelligent energy storage system-based controller that improves the MG power quality during abnormal operating conditions.

The control approach of the present disclosure is loosely based on a hybrid technique that includes a combination of a differential evolution optimization (DEO) and an artificial neural network (ANN). This utilizes complementary benefits of both strategies to perform an online tuning of controller parameters. Specifically, the controller parameters are optimized under several operating conditions using the DEO algorithm. The input and output patterns of the DEO are collected and utilized to train the ANN. The trained ANN is employed to perform an online tuning of the controller parameters.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts. Furthermore, the terms "approximately," "approximate," "about," and similar terms generally refer to ranges that include the identified value within a margin of 20%, 10%, or preferably 5%, and any values therebetween.

A microgrid (MG) system 100 according to one embodiment of the present disclosure is described with reference to FIGS. 1 to 3.

FIG. 1 is a schematic single line diagram of the MG system 100 to which the control approach of the present disclosure can be applied. The MG system 100 includes a synchronous generator 110, a photovoltaic (PV) system 120, and an energy storage system 130. The synchronous generator 110 and the PV system 120 are distributed generations (DGs), and the energy storage system 130 stores and provides electric power from and to the MG system 100. The MG system 100 is connected to a utility grid 140 and works on grid-connected mode. The synchronous generator 110, the PV system 120, and the energy storage system 130 are connected to each other via a PCC bus 150. Further, static loads 160 are connected to the MG system 100 through the PCC bus 150.

As the synchronous generator 110, any small-scale inertial-type synchronous generator that converts mechanical power output from a source such as diesel engines, steam turbines, gas turbines, reciprocating engines, hydro turbines, and the like into electrical power may be used. As the energy storage system 130, a battery energy storage system, a super-capacitor energy storage system, a superconducting magnetic energy storage, a plug-in electric vehicle, and the like may be used.

Figure 2:
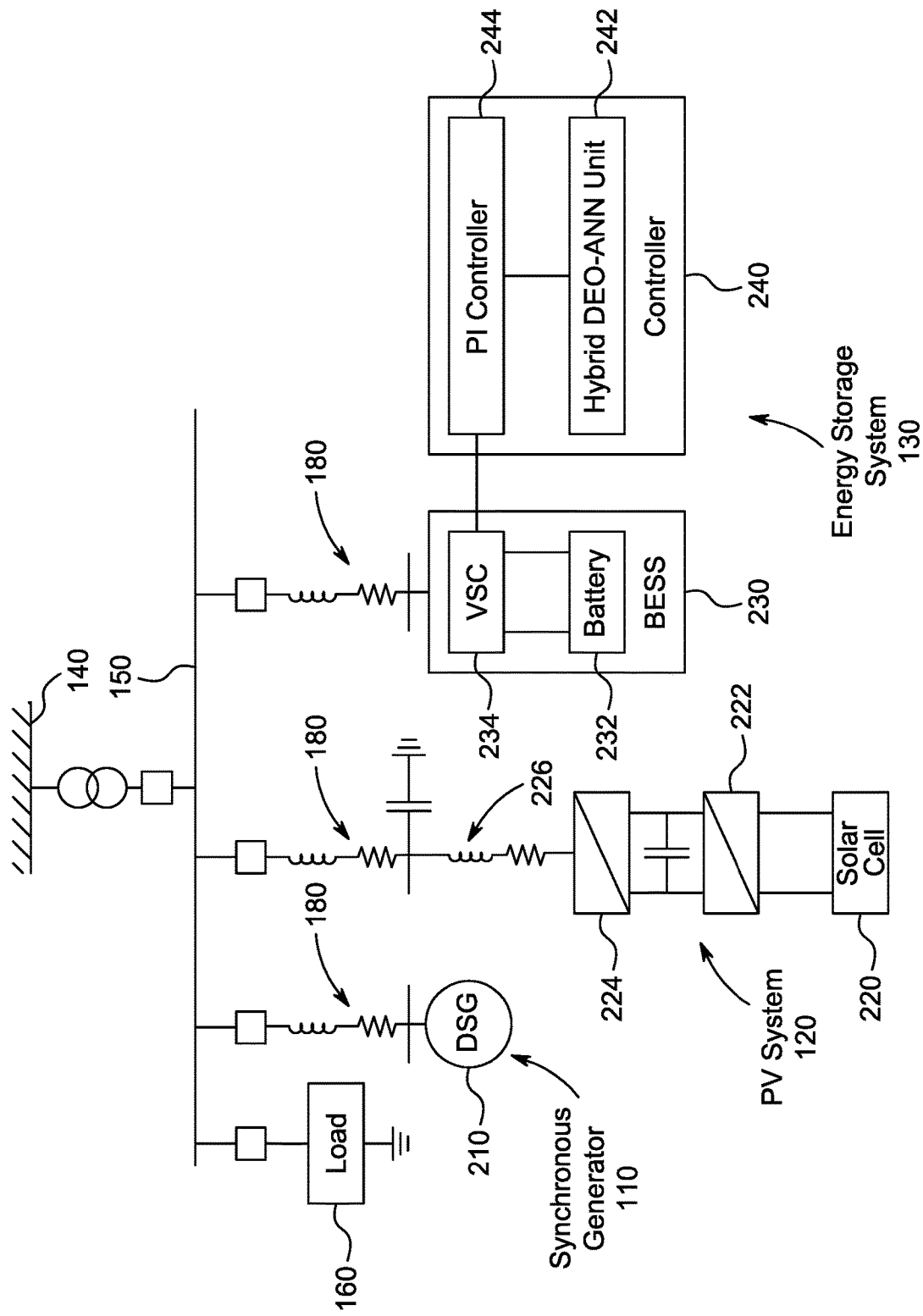
FIG. 2 is an exemplary configuration of a microgrid system, according to certain embodiments.

FIG. 2 illustrates an exemplary configuration of the MG system 100. In this example, the synchronous generator 110, the PV system 120, and the energy storage system 130 are connected to the PCC bus 150 via corresponding transmission lines 180. Further, in this example, the synchronous generator 110 is a diesel synchronous generator (DSG) 210, which is an inertial-type (mechanical) DG. The DSG 210 includes a diesel engine and an electric generator. The DSG 210 uses a mechanical means to generate electric power.

The PV system 120 is an inverter-type (non-mechanical) DG and includes solar cells 220, a DC/DC boost converter 222, a DC/AC voltage source inverter (VSI) 224, and a LC low pass filter 226. The solar cells 220 are devices that convert the energy of light directly into electricity. The solar cells 220 may be formed as a solar module, a solar panel, or a solar array. The DC/DC boost converter 222 is a DC-to-DC power converter that steps up voltage of the solar cells 220. The DC/AC voltage source inverter 224 converts a constant DC input voltage to AC voltage.

The energy storage system 130 includes a battery energy storage system (BESS) 230 and a controller 240 for controlling operation of the BESS 230. The BESS 230 includes batteries 232 and a voltage source converter (VSC) 234. The batteries 232 are rechargeable batteries that can charge and discharge electric energy. For example, as the batteries 232, lithium-ion batteries, liquid-based batteries, lithium iron phosphate batteries, lead-acid batteries, nickel-cadmium batteries, and the like may be used. The VSC 234 is a bidirectional converter that converts either from DC to AC or from AC to DC and enables power transfer in either direction. With the VSC 234, the magnitude, the phase angle, and the frequency of the output voltage can be controlled. The BESS 230 is interfaced through the VSC 234 to provide an additional active and reactive power support for the MG system 100.

The controller 240 is connected to the BESS 230 and controls operation of the BESS 230 in such a manner as to improve the power quality of the MG system 100 in case of contingencies or during abnormal operating condition. The controller 240 includes a hybrid DEO-ANN unit 242 and a proportional-integral (PI) controller 244. The PI controller 244 is a feedback control loop mechanism for controlling the VSC 234 of the BESS 230. The hybrid DEO-ANN unit 242 perform an online tuning of controller parameters of the PI controller 244 using both a differential evolution optimization (DEO) and an artificial neural network (ANN).

Figure 3:
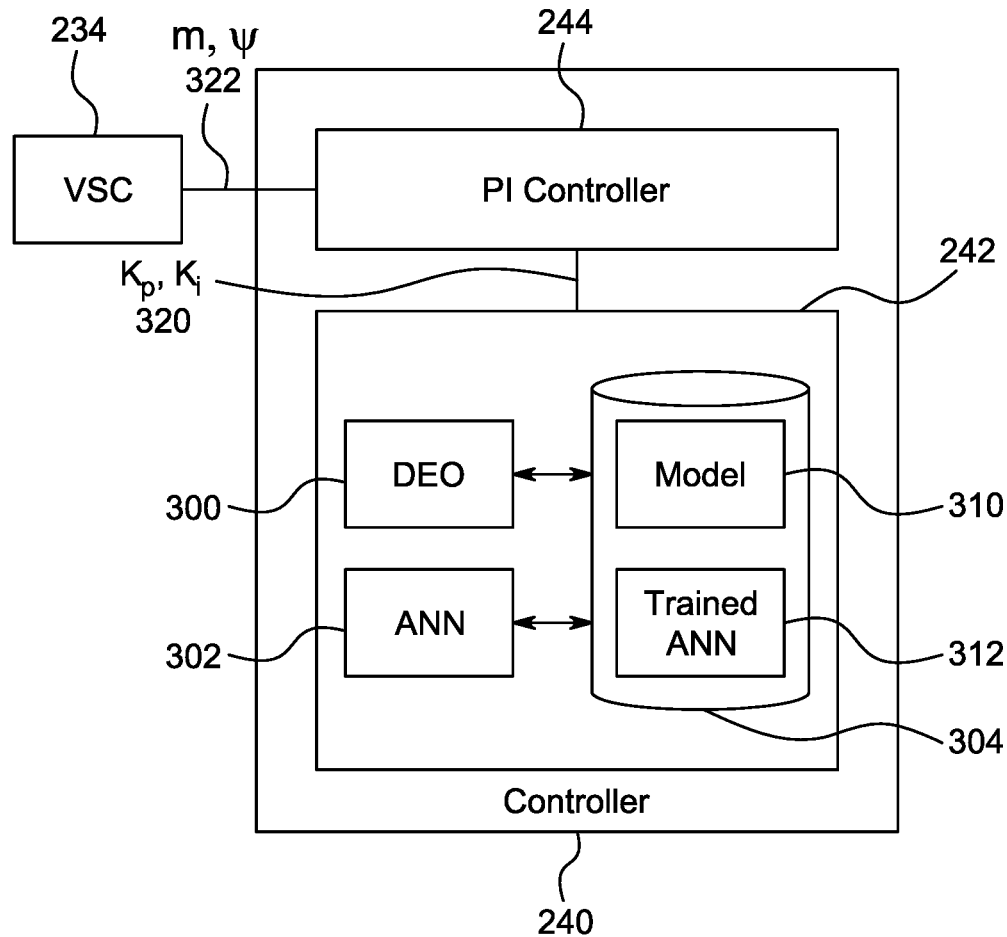
FIG. 3 is an exemplary block diagram of a controller for controlling operation of a battery energy storage system, according to certain embodiments.

FIG. 3 is an exemplary block diagram of the controller 240. The controller 240 includes the hybrid DEO-ANN unit 242 and the PI controller 244. The hybrid DEO-ANN unit 242 includes a DEO module 300, an ANN module 302, and a data storage module 304.

The data storage module 304 stores therein a mathematical model 310 representing the microgrid system 100 and the trained ANN 312 obtained by the ANN module 302. The mathematical model 310 may be prepared in a way described in the following section and stored in advance.

The DEO module 300 acquires the mathematical model 310 and obtains a plurality of sets of optimized controller parameters of the PI controller 244 by applying a plurality of levels of disturbances to a part of the mathematical model 310 corresponding to a mechanical part of the DSG 210 and optimizing, for each level of disturbance, the controller parameter of the PI controller 244 using DEO algorithm in such a manner as to restore a system frequency and a system voltage of the MG system 100 to preset normal operating limits. These disturbances simulate sudden changes in a mechanical part of the DSG 210.

The ANN module 302 trains an ANN using the plurality of levels of disturbances as input and the plurality of sets of optimized controller parameters as output and stores the trained ANN 312 in the data storage module 304.

After completing the training of the ANN, in response to the occurrence of a disturbance in the DSG 210, the hybrid DEO-ANN unit 242 determines the controller parameters (for example, Kp and Ki) based on the level of the disturbance using the trained ANN 312 and outputs the determined controller parameters 320 to the PI controller 244. The determined controller parameters are controller parameters optimized for the level of the occurred disturbance. The PI controller 244 with the optimized controller parameters 320 controls the VSC 234 of the BESS 230 using a control signal 322 including a modulation index m and a phase angle $\psi$.

The hybrid DEO-ANN unit 242 may be implemented, for example, by running a software program on a CPU of a general-purpose computer.

In the example of FIG. 3, both the hybrid DEO-ANN unit 242 and the PI controller 244 are contained in the same unit. However, the hybrid DEO-ANN unit 242 and the PI controller 244 may not be necessarily arranged close to each other. In another embodiment, the hybrid DEO-ANN unit 242 and the PI controller 244 may be physically separated from each other and connected by wireless or wired connection via a network such as Internet, WiFi, Bluetooth, Ethernet, or the like.

Further, in this example, the data storage module 304 includes only one mathematical model 310. In another embodiment, a plurality of mathematical models corresponding to different configurations of the MG system 100 may be stored in the data storage module 304.

In MG systems, distributed generations and energy storage systems are relatively small in size and may be easily added, removed, or replaced. In the case where changes in configuration of the MG system 100 are likely to occur, plausible configurations of the MG system 100 may be determined and corresponding mathematical models may be prepared and stored in advance. In that case, from among the plurality of mathematical models stored in the data storage module 304, the hybrid DEO-ANN unit selects one mathematical model that matches the current configuration of the MG system 100 before starting the DEO algorithm and the ANN training. This provides a trained ANN 304 optimized for the current configuration of the MG system 100 even in the case where the configuration of the MG system 100 changes.

Next, mathematical system modelling of the MG system 100 is described with reference to FIGS. 4 to 8.

A mathematical model representing the MG system 100 is used in the DEO algorithm to optimize the controller parameters of the PI controller 244, specifically controller gains Kp and Ki. The MG system 100 can be modeled by several non-linear differential equations that represent its dynamic behavior. In the following section, detailed mathematical representations of respective components of the MG system 100, namely, the DSG 210, the solar cell 220, the DC/DC boost converter 222, the DC/AC voltage source inverter 224, the LC low pass filter 226, and the BESS 230 are described.

Diesel Synchronous Generator

The DSG 210 can be modeled by the following four non-linear first order differential equations (1) to (4). Two equations (1) and (2) represent the mechanical part of the generator and decomposed from the well-known swing equation. The angular displacement of the generator rotor and angular speed are mathematically described as in M. A. Ali, "Control of a Microgrid Through Energy Storage Devices Using Evolutionary and Neuro-Fuzzy Methods," Master Thesis, King Fahd University of Petroleum and Minerals Dhahran, Saudi Arabia, 2013, the entire contents of which is incorporated herein by reference:

$$\frac{d\delta}{dt} = \omega_b(\omega - 1) \tag{1}$$

$$\frac{d\omega}{dt} = \frac{1}{2H}(P_m - P_e) \tag{2}$$

where $P_e$ is the output electrical power, $P_m$ is the input mechanical power, H is the inertia constant, and $\omega_0$ is the reference speed.

The other two equations (3) and (4) represent the electrical part of the generator and they are as follows:

$$\frac{de'_q}{dt} = \frac{1}{T'_{do}}[E_{jd} - e'_e - (x_d - x'_d)i_{gd}] \tag{3}$$

$$\frac{dE_{jd}}{dt} = \frac{1}{T_A}[K_A(V_{g0} - V_g) - (E_{jd} - E_{jd0})] \tag{4}$$

where $X_d$ is the d-axis synchronous reactance, $X'_d$ is the transient reactance, $T_A$ is the exciter time constant, $K_A$ is the exciter gain, $T_{do}'$ is the open circuit field constant, $E_{fdo}$ is the reference field voltage, and $V_o$ is the DSG reference terminal voltage.

The expression in equation (3) describes the internal voltage $e_q'$ along the quadrature axis (q-axis) of the generator's rotor. While, the expression in equation (4) describes the field voltage $E_{fd}$ along the direct axis (d-axis) of the generator's rotor. The state variables of the DSG model are given as:

$$X_{DSG} = [\delta, \omega, e_q', E_{fd}]$$

Solar Cell

Figure 4:
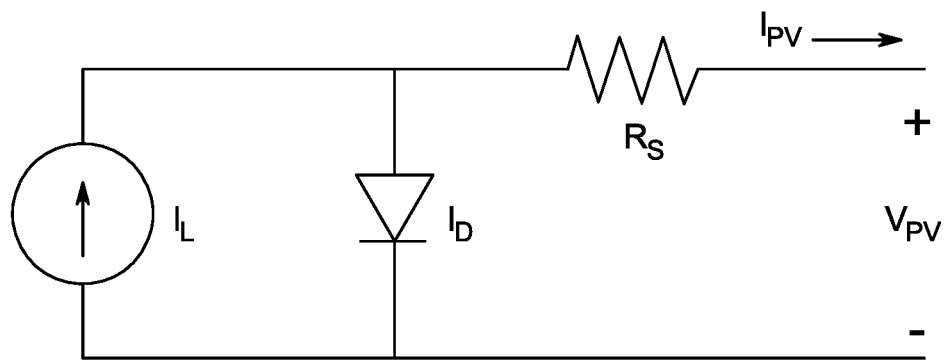
FIG. 4 is an exemplary equivalent circuit diagram of a simplified photovoltaic model, according to certain embodiments.

FIG. 4 is an exemplary equivalent circuit diagram of a simplified photovoltaic model for the solar cell 220 of the PV system 120. The solar cell 220 is the fundamental block of the PV system 120 and each consist mainly of a current source, a diode, and a resistance. The equivalent circuit shown in FIG. 4 is called the simplified PV model which consists only of a current source, a diode, and a series resistor. The PV system 120 can be modeled by the following eight non-linear first order differential equations, as described in M. A. Ali, "Control of a Microgrid Through Energy Storage Devices Using Evolutionary and Neuro-Fuzzy Methods," Master Thesis, King Fahd University of Petroleum and Minerals Dhahran, Saudi Arabia, 2013. These equations represent the dynamic behavior of the solar cell 220, associated power electronics, and a LC filter as well.

DC/DC Boost Converter and DC Link

Figure 5:
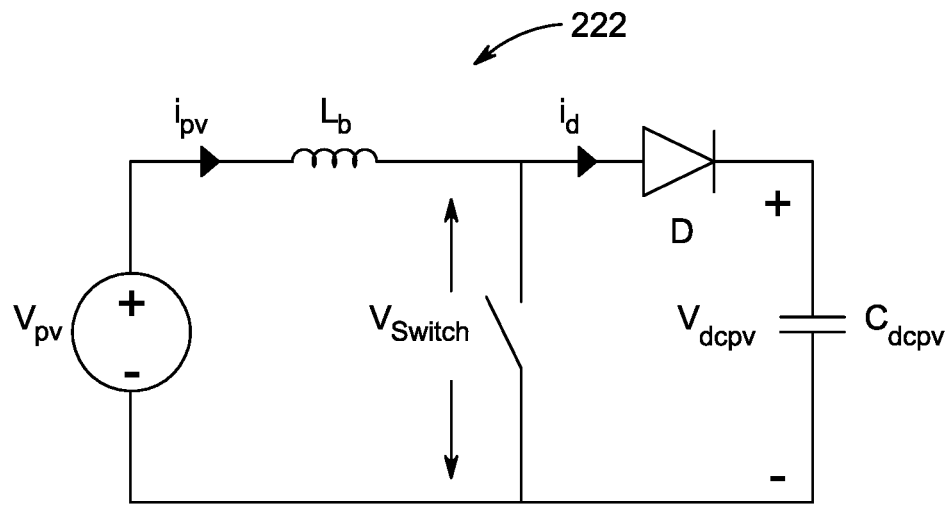
FIG. 5 is an exemplary equivalent circuit diagram of a DC/DC converter model for a PV system, according to certain embodiments.

FIG. 5 is an exemplary equivalent circuit diagram of a DC/DC converter model for the DC/DC boost converter 222. The equivalent circuit of the DC/DC boost converter 222 consists of an energy storing inductor, an IGBT switch, a forward acting diode, and a DC-Link capacitor to filter the DC/DC boost converter voltage and maintain constant input voltage to the DC/AC voltage source inverter 224. The equations (5) and (6) represent the PV output current and the DC link output voltage after the DC/DC boost converter 222, respectively.

$$\frac{di_{pv}}{dt} = \frac{1}{L_{dcb}}[V_{pvA} - (1 - dr_{pv})V_{dcpv}] \tag{5}$$

$$\frac{dv_{dcpv}}{dt} = \frac{1}{C_{dcpv}}[(1 - dr_{pv})i_{pv} - m_{pv}i_{pjd}\cos(\psi_{pv} + \theta)] \tag{6}$$

where $L_{dch}$ is the boost converter inductor, $C_{dcpv}$ is the DC link capacitor, and $dr_{pv}$ is the DC/DC converter duty ratio.

DC/AC Voltage Source Inverter

Figure 6:
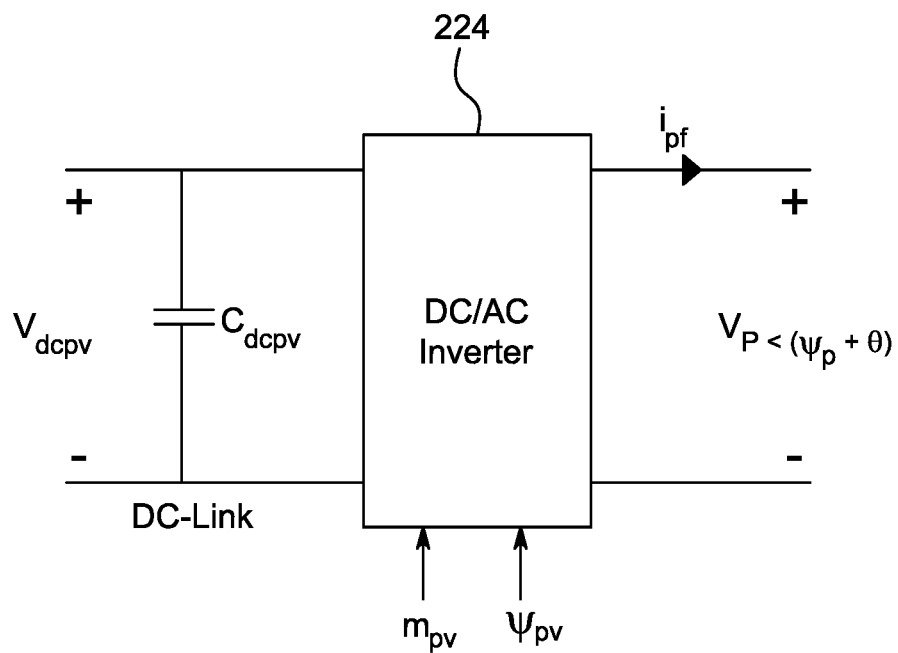
FIG. 6 is an exemplary equivalent circuit diagram of a DC/AC inverter model for the PV system, according to certain embodiments.

FIG. 6 is an exemplary equivalent circuit diagram of a DC/AC inverter model for the DC/AC voltage source inverter (VSI) 224. The VSI 224 operates in PWM mode with a modulation index $m_{pv}$ and a phase angle $\psi_{pv}$. The VSI 224 is essential to convert the DC power to an AC power in order to integrate the PV system 120 with the PCC bus 150. The mathematical expressions in equations (7) and (8) represent the inverter output current in d-axis and the inverter output current in q-axis, respectively.

$$\frac{di_{pfd}}{dt} = \frac{-w_0 R_{pf}}{L_{pf}} i_{pfd} + w_0 w i_{pfq} + \tag{7}$$

$$\frac{w_0 m_{pv} V_{dcpv}\cos(\psi_{pv} + \theta)}{L_{pf}} - \frac{w_o V_{cpd}}{L_{pf}} - w_o R_{pdr}(i_{pfd} - i_{pd})$$

$$\frac{di_{pdq}}{dt} = \frac{-w_0 R_{pf}}{L_{pf}} i_{pfq} + w_0 w i_{pfd} + \tag{8}$$

$$\frac{w_o m_{pv} V_{dcpv}\sin(\psi_{pv} + \theta)}{L_{pf}} - \frac{w_o V_{cpq}}{L_{pf}} - w_o R_{pdr}(i_{pfq} - i_{pq})$$

where $m_{pv}$ is the inverter modulation index, and $\psi_{pv}$ is the inverter phase angle.

LC Low Pass Filter and Coupling Transmission Line

Figure 7:
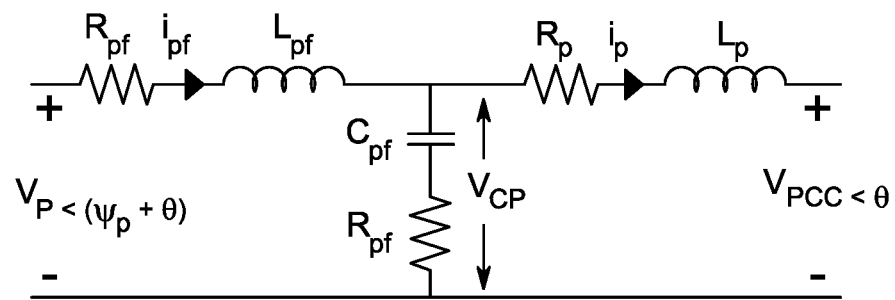
FIG. 7 is an exemplary equivalent circuit diagram of a model for a LC filter and a coupling transmission line of the PV system, according to certain embodiments.

FIG. 7 is an exemplary equivalent circuit diagram of the LC low pass filter 226 along with the transmission line (TL) coupling impedance of the PV system 120. The following set of mathematical equations (9), (10), (11) and (12) represent the LC filter current in d-axis, the LC filter current in q-axis, the filter capacitor voltage in d-axis, and the filter capacitor voltage in q-axis, respectively.

$$\frac{di_{pd}}{dt} = \frac{-w_0 R_p}{L_p} i_{pd} + w_o w i_{pq} + \frac{w_o}{L_p}(V_{cpd} - V_{sd}) + w_o R_{pdr}(i_{pfd} - i_{pd}) \quad (9)$$

$$\frac{di_{pq}}{dt} = \frac{-w_0 R_p}{L_p} i_{pq} + w_o w i_{pd} + \frac{w_o}{L_p}(V_{cpq} - V_{sq}) + w_o R_{pdr}(i_{pfq} - i_{pq}) \quad (10)$$

$$\frac{dV_{cpd}}{dt} = \frac{1}{C_{pf}}(i_{pfd} - i_{pd}) + w_o w V_{cpq} \quad (11)$$

$$\frac{dV_{cpq}}{dt} = \frac{1}{C_{pf}}(i_{pfq} - i_{pq}) + w_o w V_{cpd} \quad (12)$$

where $R_{pf}$ is the filter resistance, $R_p$ is the coupling TL resistance, $L_{pf}$ is the filter inductance, $L_p$ is the coupling TL inductance, $C_{pf}$ is the filter capacitor, and $R_{pdr}$ is the damping resistor. The state variables of the PV system model are given as:

$$X_{PV} = [i_{pv}, V_{dcpv}, i_{pfd}, i_{pfq}, i_{pd}, i_{pq}, V_{cpd}, V_{cpq}]$$

Battery Energy Storage System

Figure 8:
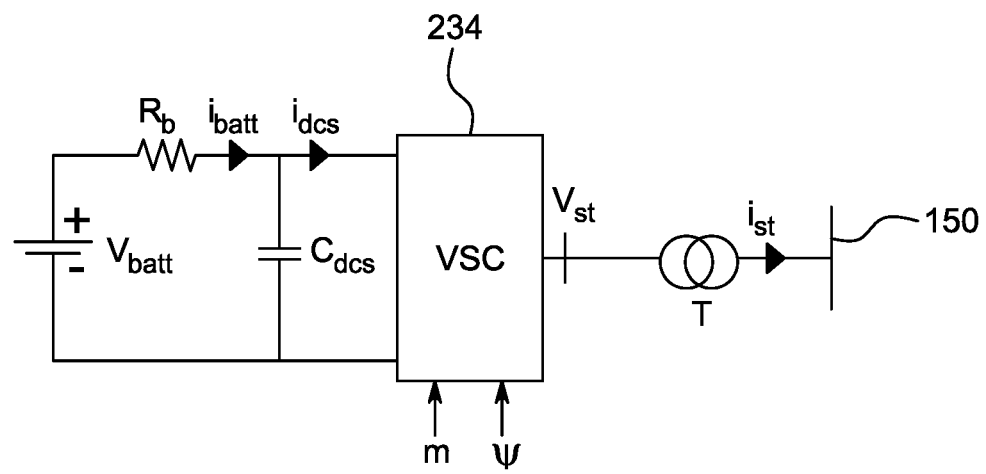
FIG. 8 is an exemplary equivalent circuit diagram of a battery energy storage system model, according to certain embodiments.

FIG. 8 is an exemplary equivalent circuit diagram of a BESS model for the BESS 230. The BESS 230 can be modeled as a single DC source connected in series with a resistor and integrated with the PCC bus 150 through the VSC 234. The BESS model that is given in equations (13) and (14) describes the currents in d-axis and q-axis, whereas equation (15) represents the voltage of the DC-link capacitor as described in M. A. Ali, "Control of a Microgrid Through Energy Storage Devices Using Evolutionary and Neuro-Fuzzy Methods," Master Thesis, King Fahd University of Petroleum and Minerals Dhahran, Saudi Arabia, 2013.

$$\frac{di_{std}}{dt} = \frac{-w_0 R_{st}}{L_{st}} i_{std} + \frac{\omega}{\omega_0} i_{stq} + \frac{\omega_0}{L_{st}}(m V_{dcs} \cos(\theta + \psi) - V_{sd}) \quad (13)$$

$$\frac{di_{stq}}{dt} = \frac{-w_0 R_{st}}{L_{st}} i_{stq} + \frac{\omega}{\omega_0} i_{std} + \frac{\omega_0}{L_{st}}(m V_{dcs} \cos(\theta + \psi) - V_{sq}) \quad (14)$$

$$\frac{dV_{dcs}}{dt} = \frac{m}{c_{dcs}}(i_{stq}\cos(\psi) + i_{stq}\sin(\psi)) + \frac{V_{batt} - V_{dcs}}{R_b C_{dcs}} \quad (15)$$

where $R_{st}$ is the VSC resistance, $L_{st}$ is the VSC inductance, m is the converter modulation index, $\psi$ is the converter phase angle, $C_{dcs}$ is the DC-ling capacitance, and Ry is the battery resistance. The state variables of the BESS model are given as:

$$X_{BESS} = [i_{std}, i_{stq}, V_{dcs}]$$

An aim of the control approach of the present disclosure is to improve the power quality of the MG system 100. In the present embodiment, this is achieved by restoring the system frequency and the system voltage of the MG system 100 to the steady state condition in case of having a disturbance in the input mechanical power of the DSG 210. To solve this problem, optimal design of the PI controller 244 that gives the minimum frequency error is preferably carried out. Therefore, the objective function basically is to minimize the system frequency integral squared-error (ISE) of the MG system 100 as follows:

$$\text{Min} \int_0^t (\Delta\omega)^2 dt = \int_0^t (\omega_0 - \omega)^2 dt \quad (16)$$

where $\omega_0$ is the reference frequency and $\omega$ is the system frequency. In doing so, some constraints on the PI controller limits shall be met. The controller parameters Kp and Ki shall be as follows:

70≤Kp≤250

70≤Ki≤250

The acceptable operating limits of the system frequency and the system voltage of the MG system 100 are given in Table 1.

TABLE 1

| Quantity | Minimum value (p.u) | Maximum value (p.u) |
|---|---|---|
| Frequency | 0.999 | 1.001 |
| Voltage | 0.95 | 1.05 |

In the present embodiment, the hybrid DEO-ANN unit 242 is used to optimize the PI controller 244. The main role of the controller 240 is to improve the power quality and restore the MG system 100 to its steady state condition after the occurrence of a disturbance. In order to achieve this type of control, a proper selection of the controller parameters (Kp and Ki) is required.

Figure 9:
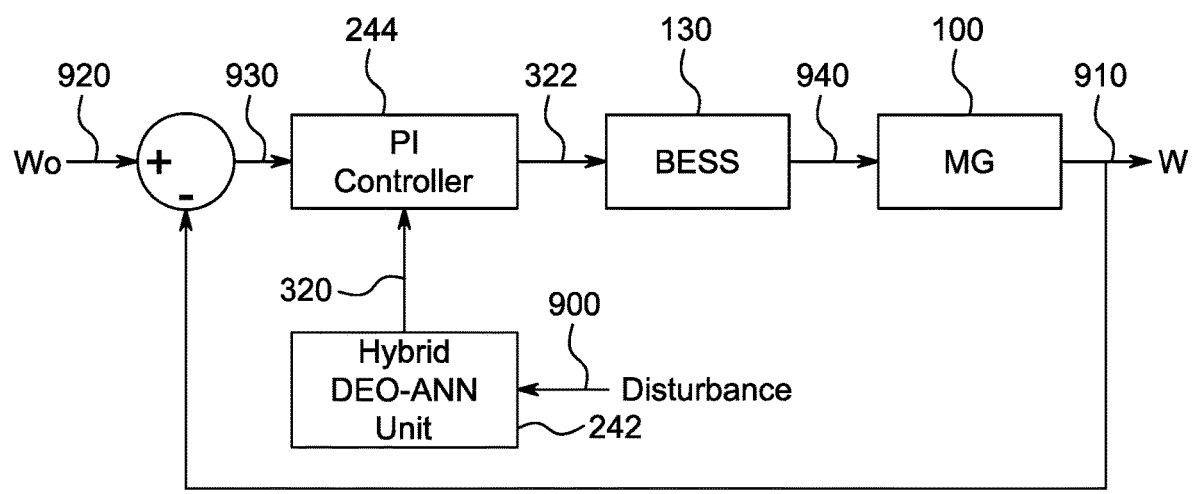
FIG. 9 is an exemplary control diagram of a microgrid system, according to certain embodiments.

FIG. 9 illustrates an exemplary control diagram of the MG system 100. In this control mechanism, a system frequency ($\omega$) 910 of the MG system 100 is compared to a preset reference frequency ($\omega_0$) 920. The mismatch between the two frequencies represents an error that needs to be minimized. Then, an error signal 930 representing this error is input into the PI controller 244 of the controller 240, and the following control signal 322 is output:

$$\text{Control\_Signal} = K_p * e(t) + K_i * \int_0^t e(t) dt \quad (17)$$

The control signal 322 controls the VSC 234 of the BESS 230 through the modulation index m and the phase angle $\psi$. Accordingly, the BESS 230 supplies or absorbs power 940, both active power P and reactive power Q, depending on the system needs. The active power enhances the dynamic performance through a quick damping of the oscillations consequently, and the system frequency of the MG system 100 returns to the steady state condition. The reactive power improves the voltage recovery at the PCC bus 150. As a result, the MG power quality is improved.

In the present embodiment, the hybrid DEO-ANN unit 242 performs an online tuning of the controller parameters of the PI controller 244 in response to a disturbance 900 occurred in the DSG 210 using the trained ANN 312. The trained ANN 312 is obtained in advance by optimizing the controller parameters under different levels of disturbances simulating, for example, sudden changes in an input mechanical torque of the DSG 210 using the DEO algorithm and by training the ANN using the different levels of the disturbances, which are input patterns of the DEO algorithm, and corresponding optimized controller parameters, which are output patterns of the DEO algorithm.

The DEO algorithm is being used as an optimization technique to find values of the controller parameters. The DEO is one type of evolutionary algorithm (EAs) which is a population-based optimization technique. Other EAs include genetic algorithms (GA), genetic programming (GP), evolutionary programming (EP), and evolution strategy (ES) as described in D. Dasgupta and Z. Michalewicz, *Evolutionary algorithms in engineering applications*, Springer Science & Business Media, 2013, the entire contents of which is incorporated herein by reference.

The DEO is distinguished by its simplicity, robustness, and fast convergence. In addition, the DEO is suitable to solve systems that can be represented by non-linear differential equations as described in R. Storn, "On the usage of differential evolution for function optimization," in *Biennial conference of the 626 North American fuzzy information processing society (NAFIPS)*, Berkeley, California, USA, 1996, vol. 519:627 IEEE, the entire contents of which is incorporated herein by reference. Since the MG system 100 under consideration consists of a number of non-linear differential equations, the DEO technique is suitable to optimize the controller parameters of the PI controller 244.

Figure 10:
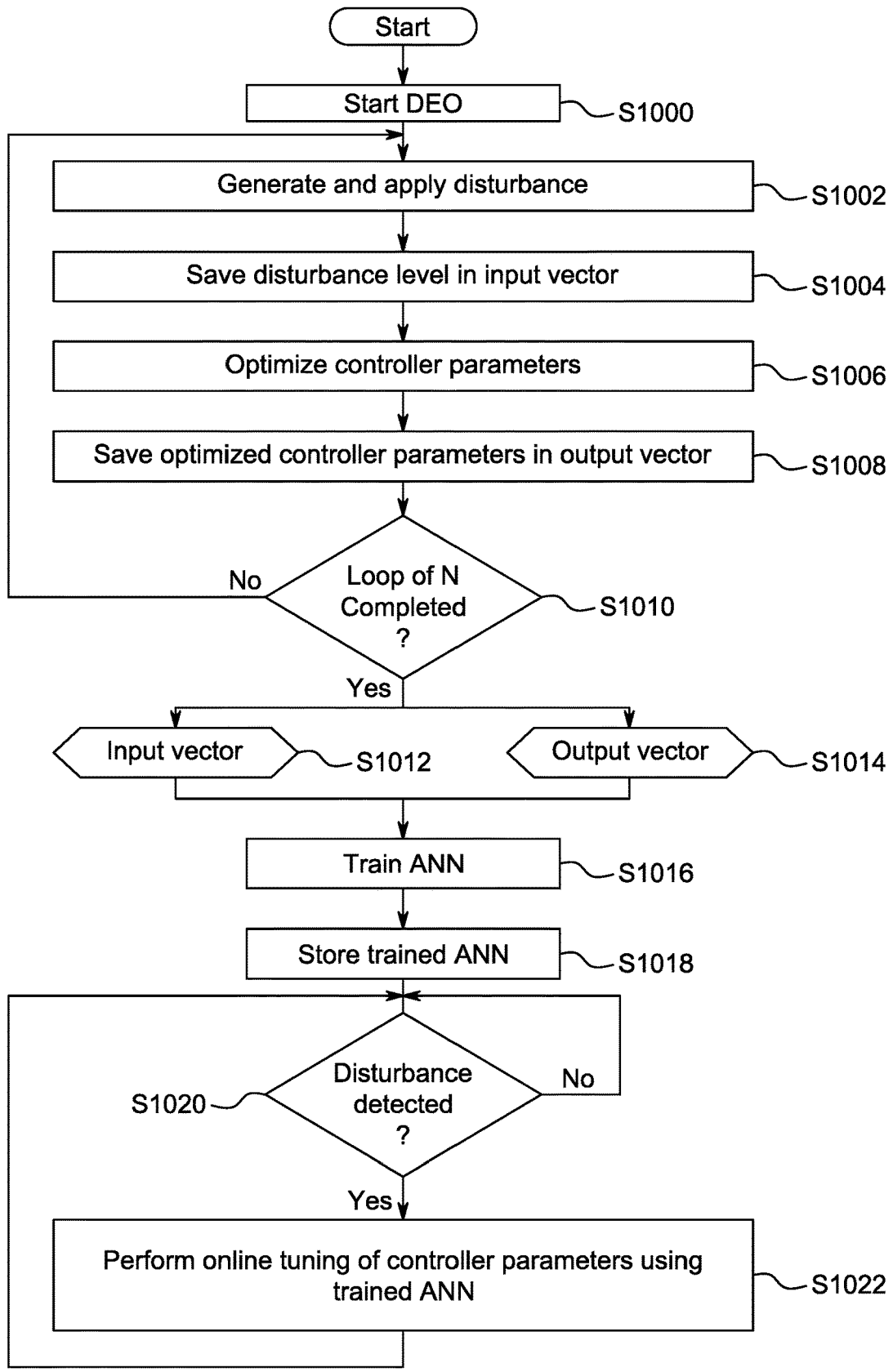
FIG. 10 is an exemplary flowchart of a control method, according to certain embodiments.

FIG. 10 is an exemplary flowchart of a control method according to the present embodiment. First, the DEO algorithm starts with the initialization of DEO and the acquisition of the mathematical model 310 from the data storage module 304 (S1000). Next, a disturbance of a preset level is generated and applied to a part of a mathematical model corresponding to an input mechanical torque of the DSG 210 (S1002), and the level of the disturbance is saved in an input vector (S1004). The disturbance simulates a sudden change in a mechanical part of the DSG 210.

Next, the controller parameters (Kp and Ki) are optimized in such a manner as to restore the system frequency and the system voltage of the MG system 100 to preset normal operating limits (S1006), and the optimized controller parameters are saved in an output vector (S1008). The foregoing steps S1002 to S1008 are repeated a preset number of times (N) while changing the level of a disturbance each time. When the loop of N is completed (Yes in step S1010), the input vector and the output vector are completed (S1012 and S1014). The input vector includes the levels of disturbance in the respective operating conditions, and the output vector includes the optimum solutions (Kp and Ki) in the respective operating conditions.

Next, the ANN is trained using data of the input vector and the output vector (S1016). The training of the ANN starts by feeding the collected input patterns (disturbance levels) and output patterns (controller parameters) into the ANN in a sequence. The backpropagation algorithm is implemented as a training algorithm for each operating condition such that the obtained outputs are compared with the targeted outputs. Then, the error (mismatch) signal is propagated back in order to adjust the weighting matrices of the ANN.

Upon completing the training of the ANN, the trained ANN 312 is stored in the data storage module 304 for later reference (S1018). Once the ANN is trained, the weighting matrices can identify the controller parameters for a certain operating condition within the training range. When a disturbance is detected (Yes in step S1020), an online tuning is performed (S1022). The optimized controller parameters (Kp and Ki) are determined based on the level of the detected disturbance using the trained ANN 312 and are output to the PI controller 244 for optimization of the controller parameters of the PI controller 244.

Figure 11:
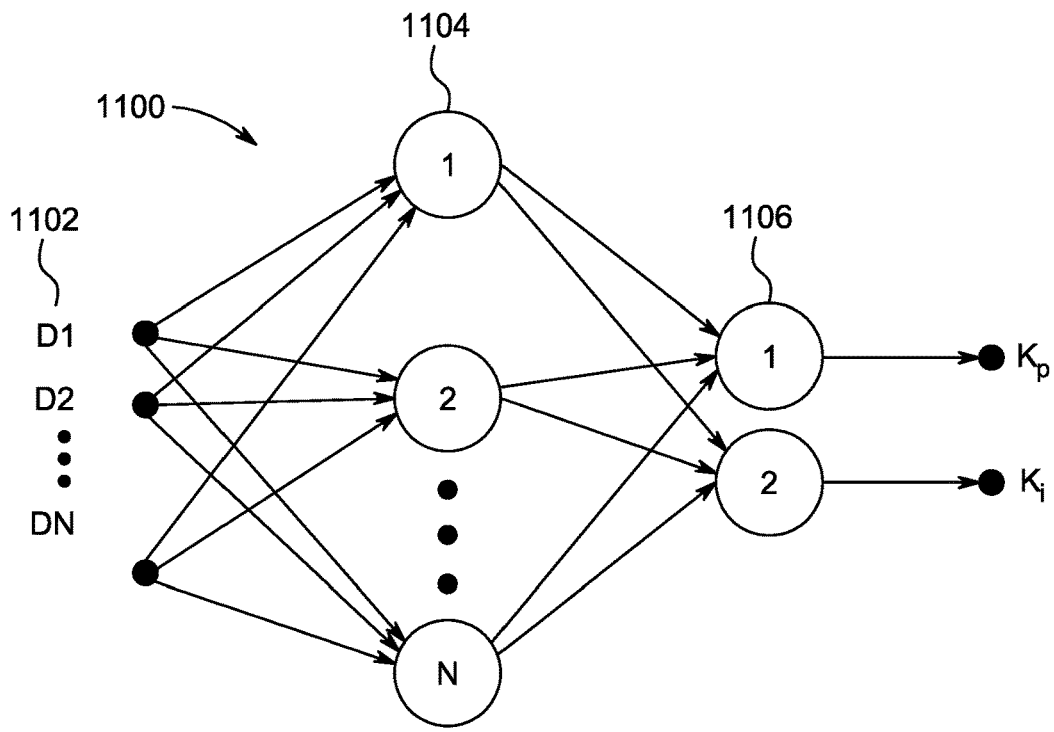
FIG. 11 is an exemplary diagram of an artificial neural network (ANN), according to certain embodiments.

FIG. 11 illustrates an exemplary ANN 1100. The ANN 1100 consists of an input layer 1102 with N levels of disturbances D1, D2, . . . , DN, a hidden layer 1104 with N neurons, and an output layer 1106 with two neurons that gave the optimized controller parameters (Kp and Ki). As the training algorithm, for example, the backpropagation algorithm may be used with a hyperbolic tangent activation function for the hidden neurons and a linear activation function for the output neurons.

In one specific example, N may be set to 200. In this case, the levels of disturbances ranging from 0.2 p.u to 0.8 p.u may be applied to the DSG 210 in steps of 0.003 p.u. For each operating condition, the PI controller parameters (Kp and Ki) are optimized using the DEO technique to improve the power quality and restore the system frequency and the system voltage of the MG system 100 back to normal operating limits as stated earlier in Table 1. Further, in this case, the ANN 1100 of FIG. 11 may consist of the input layer 1102 with 200 levels of disturbances D1, D2, . . . . D200, the hidden layer 1104 with 200 neurons, and the output layer 1106 with two neurons Kp and Ki.

Figure 12:
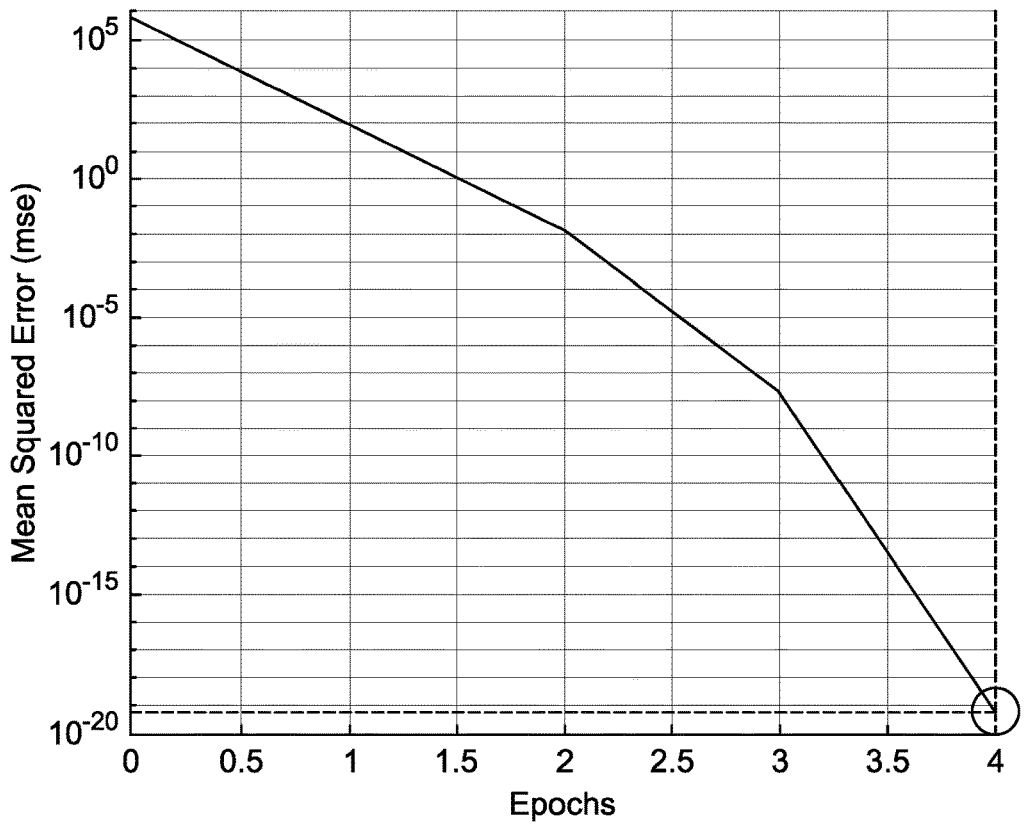
FIG. 12 is a graph illustrating an exemplary ANN training performance curve, according to certain embodiments.

FIG. 12 is a graph illustrating a performance curve of an exemplary ANN that has been trained to give the optimal PI controller parameters for any disturbance within the training range. It can be observed clearly that the best training performance is found to be at Epoch number 4 with mean squared error (MSE) converging close to zero (5.3628e-20), indicating that the ANN is very well trained.

Further, after completing the training of the ANN, a random disturbance between 0.2 p.u and 0.8 p.u is generated (in this example, 0.3135 p.u) in order to verify the performance of the trained ANN 312. The generated disturbance is input into the trained ANN 312, and then the output controller parameters are obtained as shown in Table 2 without violating the specified controller parameters' constraint limits.

TABLE 2

| Controller parameter | Value |
|---|---|
| Kp | 128.22 |
| Ki | 161.78 |

FIGS. 13-26 illustrate simulation results of dynamic responses of the MG system 100 with and without action of controller along with the comprehensive comparison for the controller 240 of the present embodiment, which includes the PI controller 244 and the hybrid DEO-ANN unit 242, and a well-known benchmark classical proportional-integral-derivative (PID) controller. In these figures, the solid line denotes the response with action of the controller 240 of the present embodiment, the dashed line denotes the response with action of the PID controller, and the dashed-dotted line denotes the response without action of controller.

The PID controller is widely used as a benchmark controller, and many papers in the literature compare the performance of their proposed controllers with the performance of the classical PID controller, as described in G. Parise, L. Martirano, M. Kermani, and M. Kermani, "Designing a power control strategy in a microgrid using PID/fuzzy controller based on battery energy storage," in *the International Conference on Environment and Electrical Engineering and Industrial and Commercial Power Systems Europe (EEEIC/I&CPS Europe)*, Milan, Italy, 2017, pp. 1-5: IEEE, M. Kermani, "Transient voltage and frequency stability of an isolated microgrid based on energy storage systems," in the 16*th International Conference on Environment and Electrical Engineering (EEEIC)*, Florence, Italy, 2016, pp. 1-5: IEEE, H. Li, X. Wang, and J. Xiao, "Differential Evolution-Based Load Frequency Robust Control for Micro-Grids with Energy Storage Systems," *Energies*, vol. 11, no. 7, p. 1686, 2018, and M. A. Ali, "Control of a Microgrid Through Energy Storage Devices Using Evolutionary and Neuro-Fuzzy Methods," Master Thesis, King Fahd University of Petroleum and Minerals Dhahran, Saudi Arabia, 2013, the entire contents of which are incorporated herein by reference.

Figure 13:
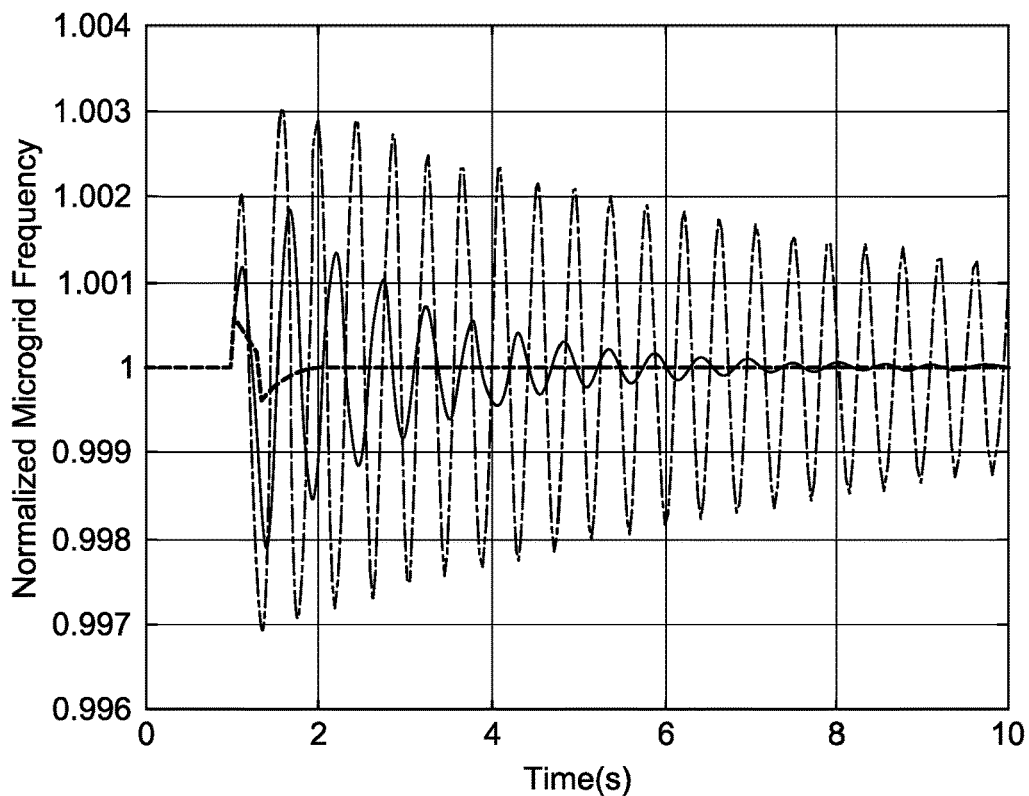
FIG. 13 is a graph illustrating a simulation result of dynamic response of a microgrid system frequency with action of a contoller according to one embodiment, with action of a PID controller, and without action of controller.
Figure 14:
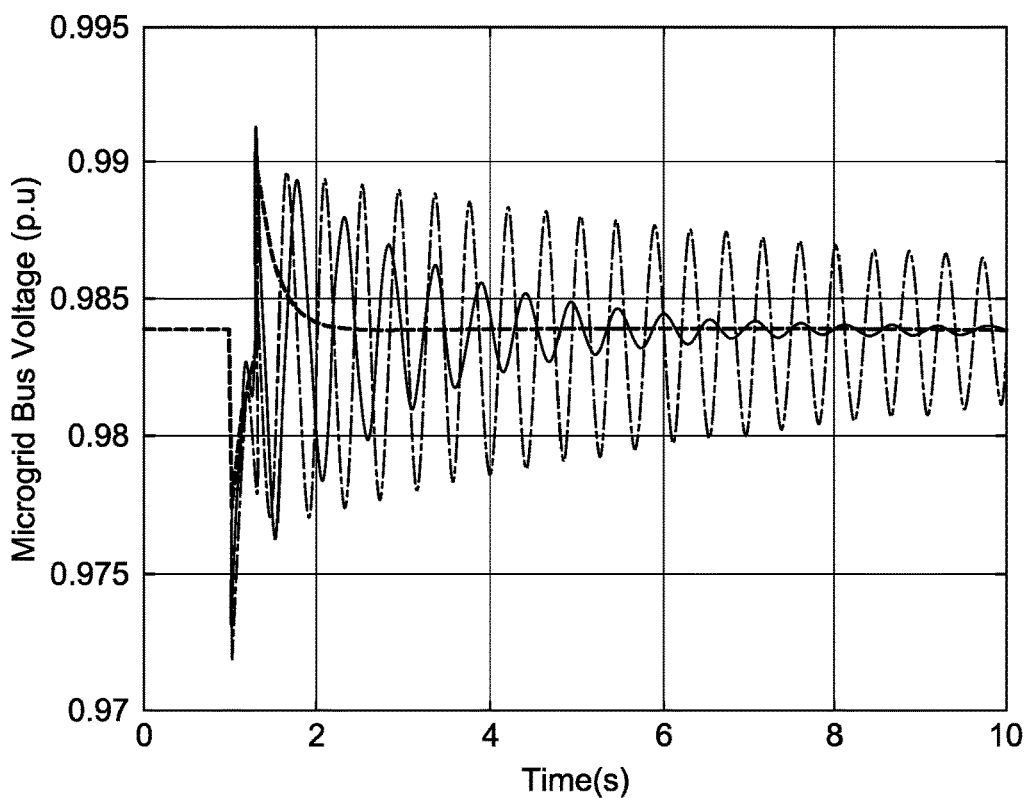
FIG. 14 is a graph illustrating a simulation result of dynamic response of a microgrid system voltage with action of the controller of the one embodiment, with action of the PID controller, and without action of controller.

FIG. 13 and FIG. 14 demonstrate simulation results of performance comparison of the controller 240 according to the present embodiment, which optimizes the controller parameters of the PI controller 244 using the trained ANN 312. It can be observed that the controller 240 of the present embodiment performs better than the PID controller in terms of stabilization time to restore the system frequency and the system voltage of the MG system 100 to the normal operating condition within a period of 1.5 seconds.

Figure 15:
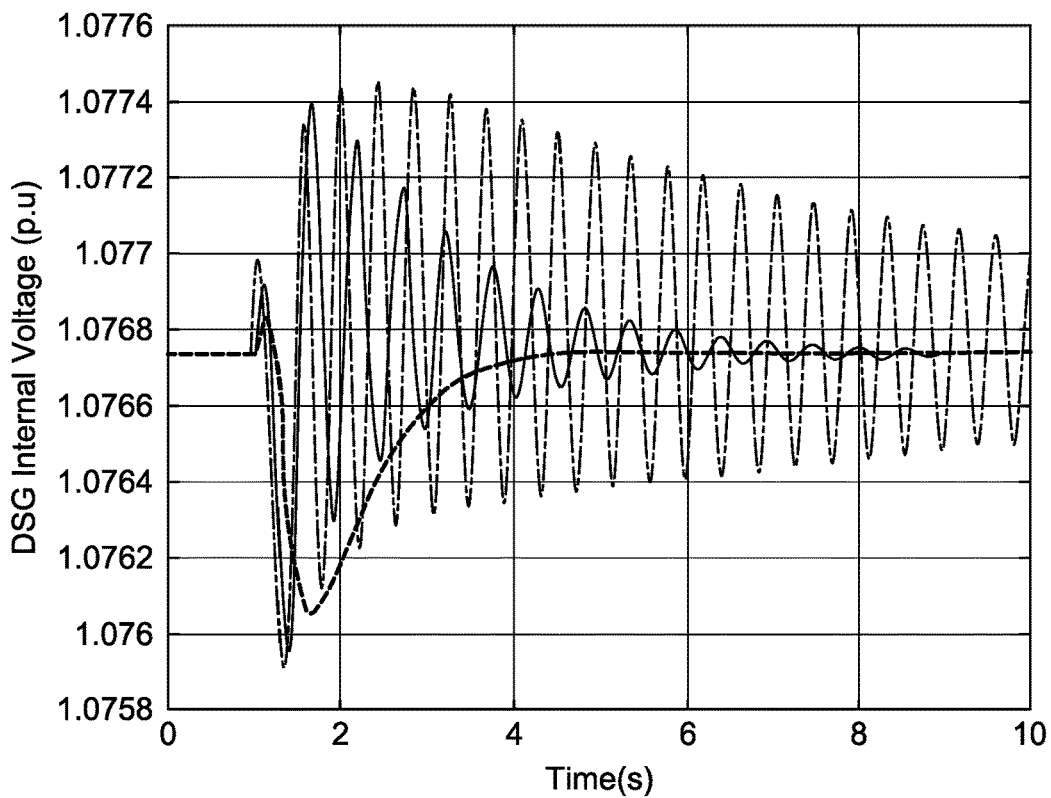
FIG. 15 is a graph illustrating a simulation result of dynamic response of an diesel synchronous generator internal voltage with action of the controller of the one embodiment, with action of the PID controller, and without action of controller.
Figure 16:
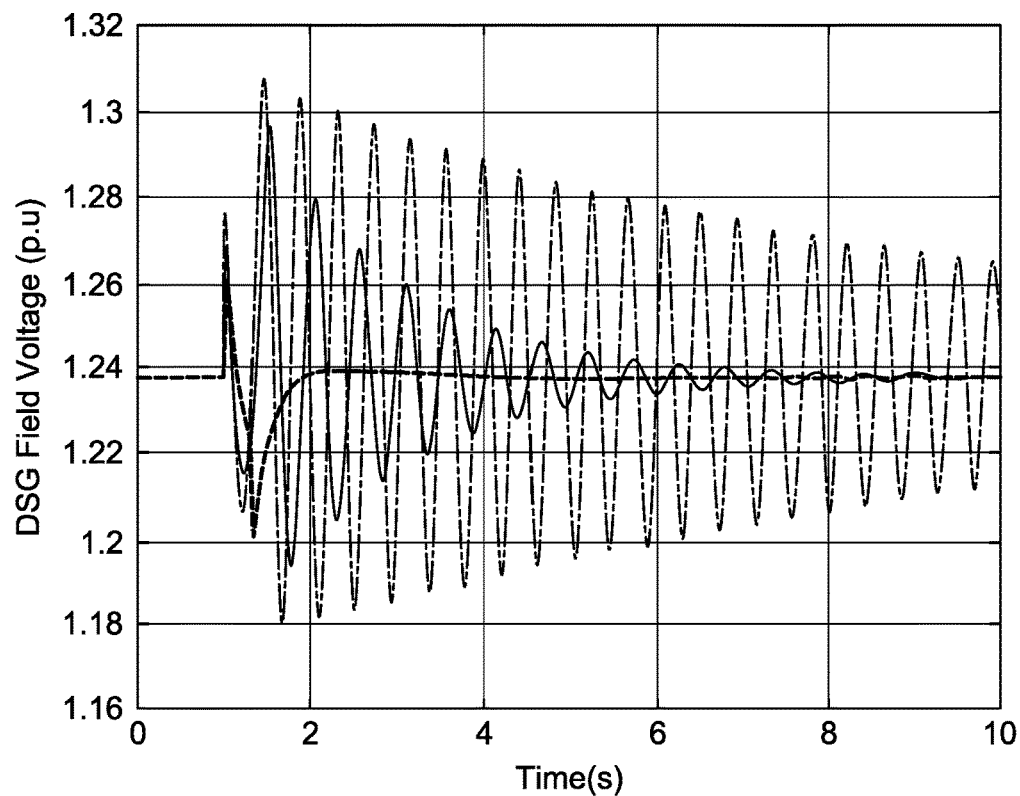
FIG. 16 is a graph illustrating a simulation result of dynamic response of an diesel synchronous generator field voltage with action of the controller of the one embodiment, with action of the PID controller, and without action of controller.

Simulation results of variations in the DSG internal voltage and the DSG field voltage are shown in FIG. 15 and FIG. 16, respectively. It can be seen from those two figures that in the absence of the control action, the oscillations in the DSG internal voltage and the DSG field voltage continue for a longer period of time. However, with the action of the controller 240 of the present embodiment, oscillations are damped quickly and returned to the steady-state condition in 3 seconds for the DSG internal voltage and less than 1.5 seconds for the DSG field voltage.

Figure 17:
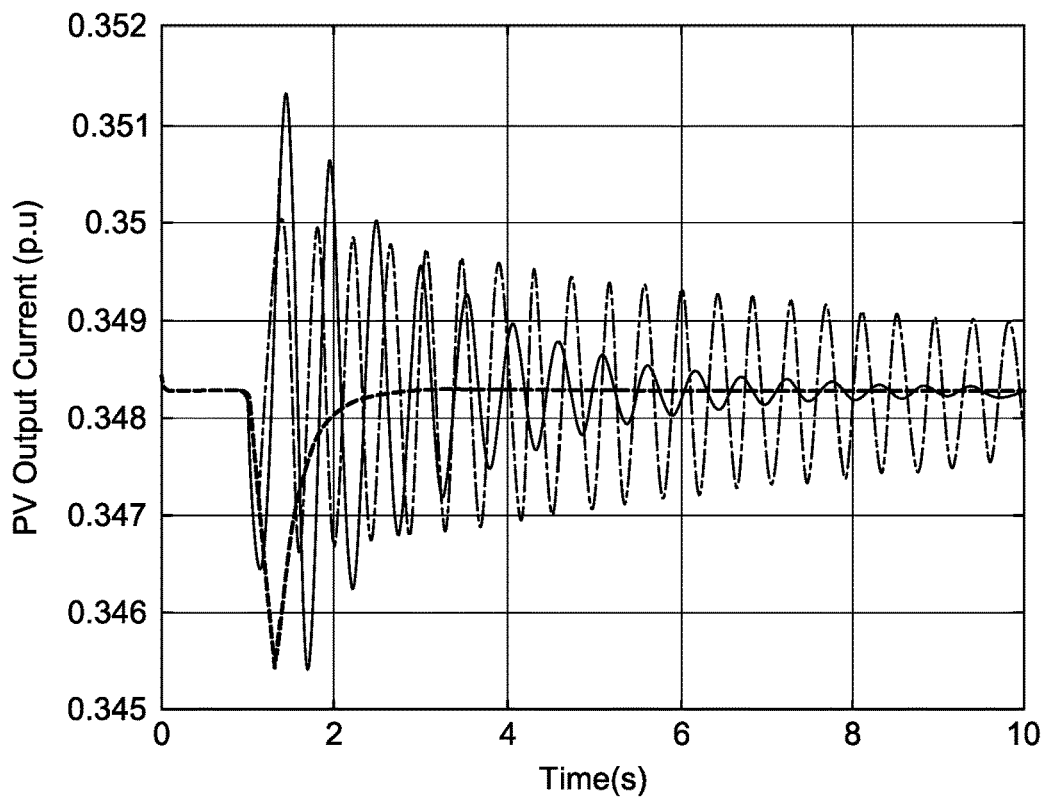
FIG. 17 is a graph illustrating a simulation result of dynamic response of a PV output current with action of the controller of the one embodiment, with action of the PID controller, and without action of controller.
Figure 18:
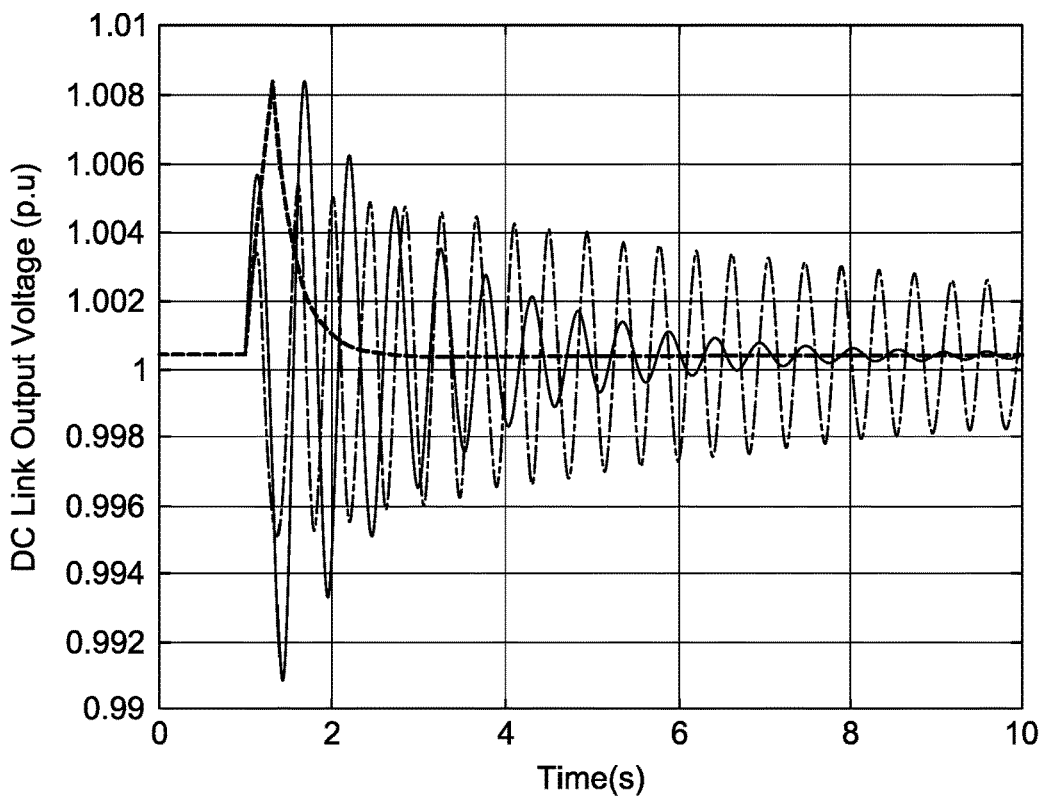
FIG. 18 is a graph illustrating a simulation result of dynamic response of a DC link output voltage with action of the controller of the one embodiment, with action of the PID controller, and without action of controller.

Simulation results of transient responses of the PV output current and the DC link output voltage are recorded in FIG. 17 and FIG. 18, respectively. Without the controller 240 of the present embodiment, the PV output current and the DC link output voltage fluctuate for more than 10 seconds. However, with the action of the controller 240 of the present embodiment, the fluctuations are damped quickly, restoring the PV output current and the DC link output voltage to the steady-state condition in less than 2 seconds.

Figure 19:
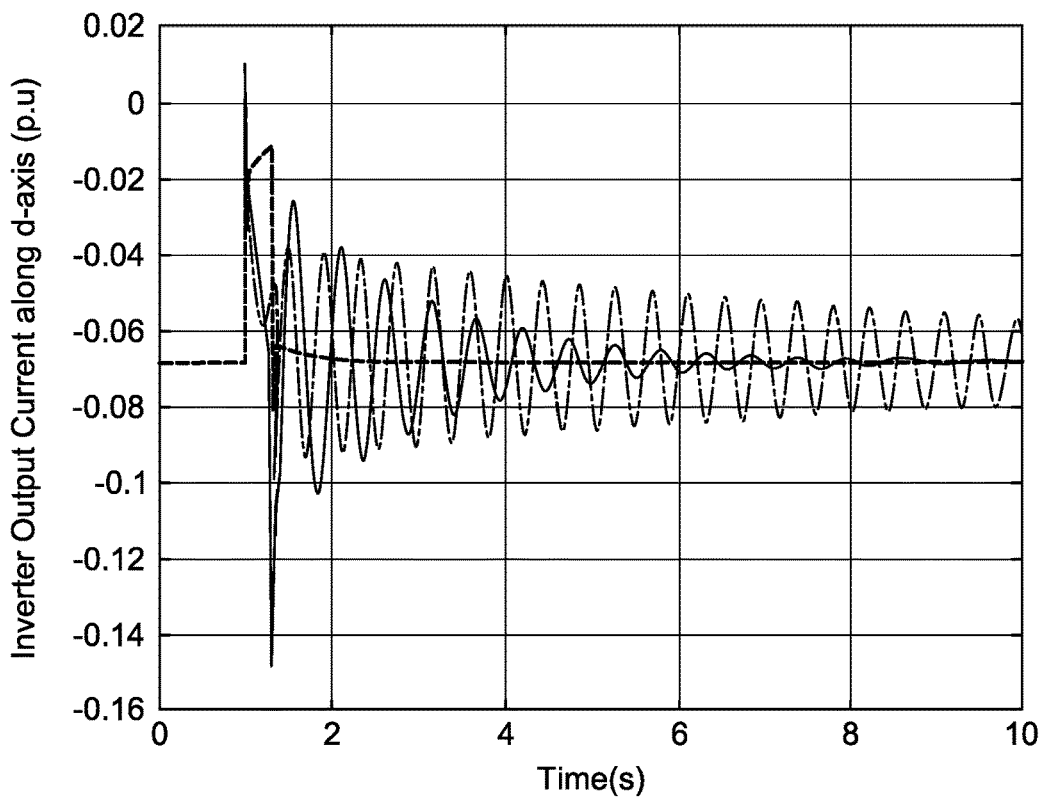
FIG. 19 is a graph illustrating a simulation result of dynamic response of a DC/AC inverter output current along d-axis with action of the controller of the one embodiment, with action of the PID controller, and without action of controller.
Figure 20:
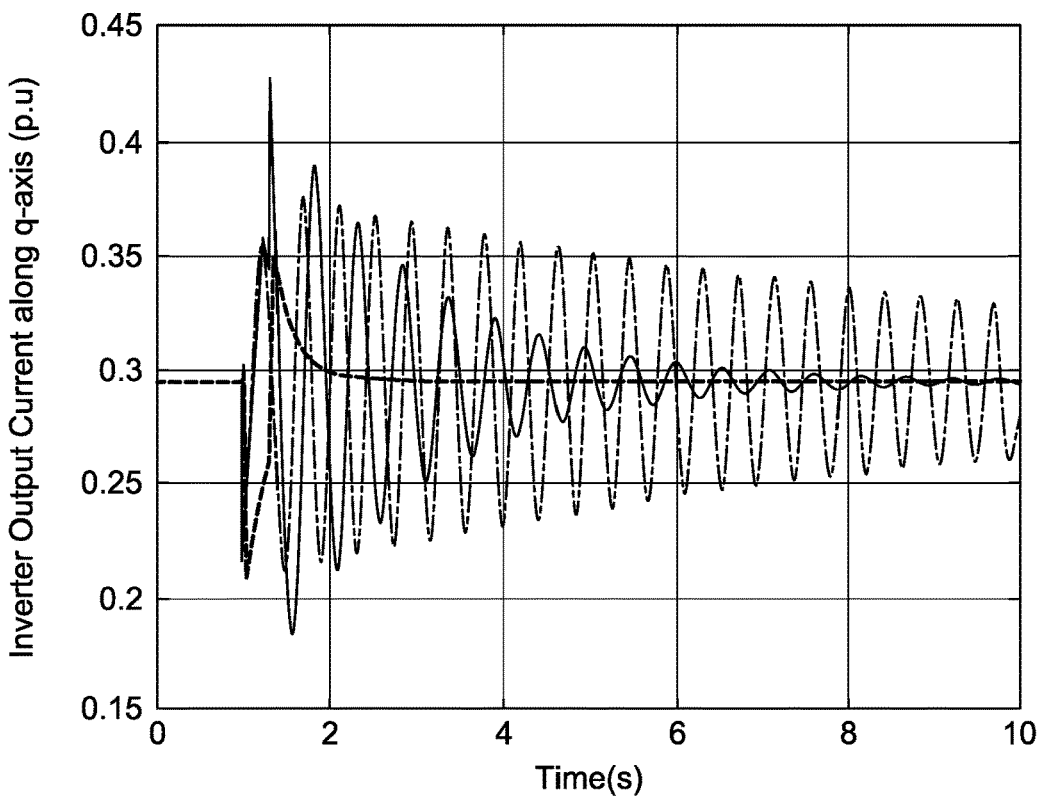
FIG. 20 is a graph illustrating a simulation result of dynamic response of a DC/AC inverter output current along q-axis with action of the controller of the one embodiment, with action of the PID controller, and without action of controller.
Figure 21:
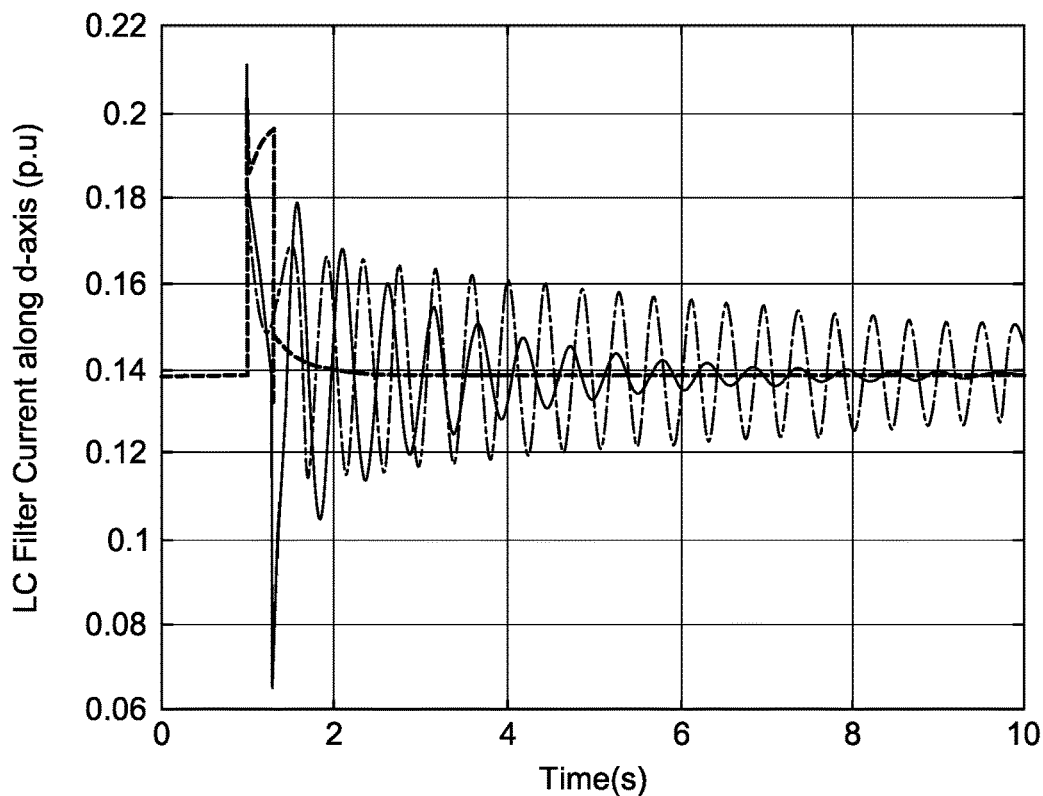
FIG. 21 is a graph illustrating a simulation result of dynamic response of a LC filter output current along d-axis with action of the controller of the one embodiment, with action of the PID controller, and without action of controller.
Figure 22:
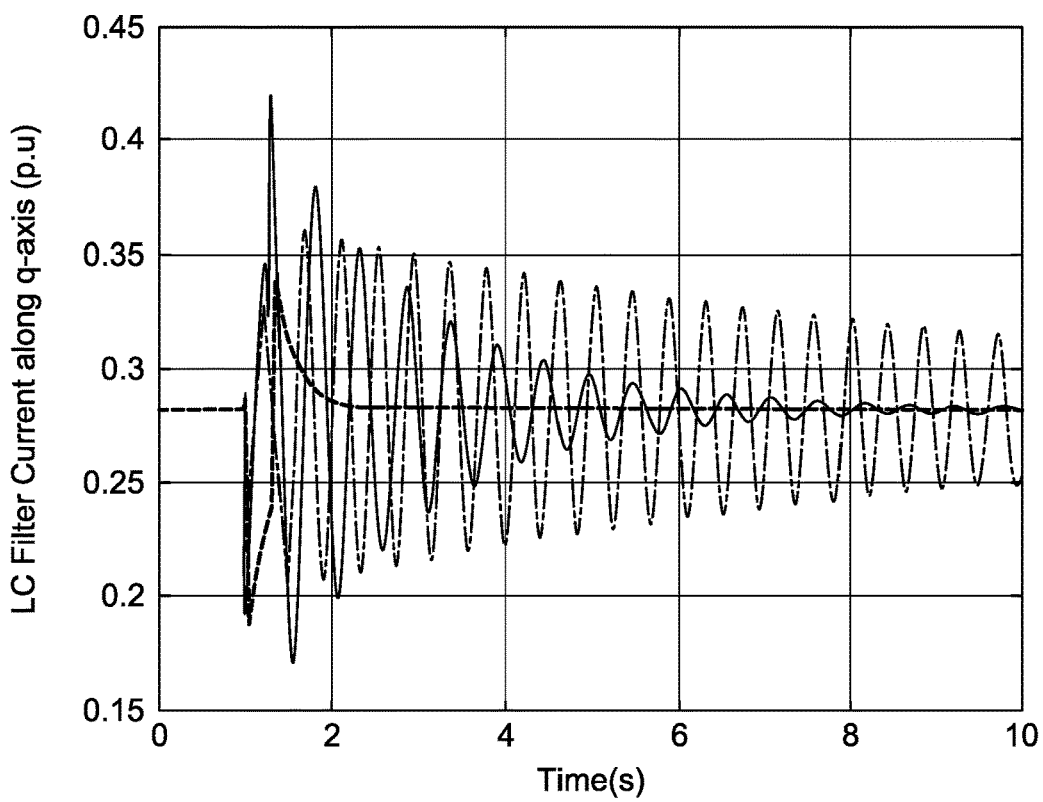
FIG. 22 is a graph illustrating a simulation result of dynamic response of a LC filter output current along q-axis with action of the controller of the one embodiment, with action of the PID controller, and without action of controller.
Figure 23:
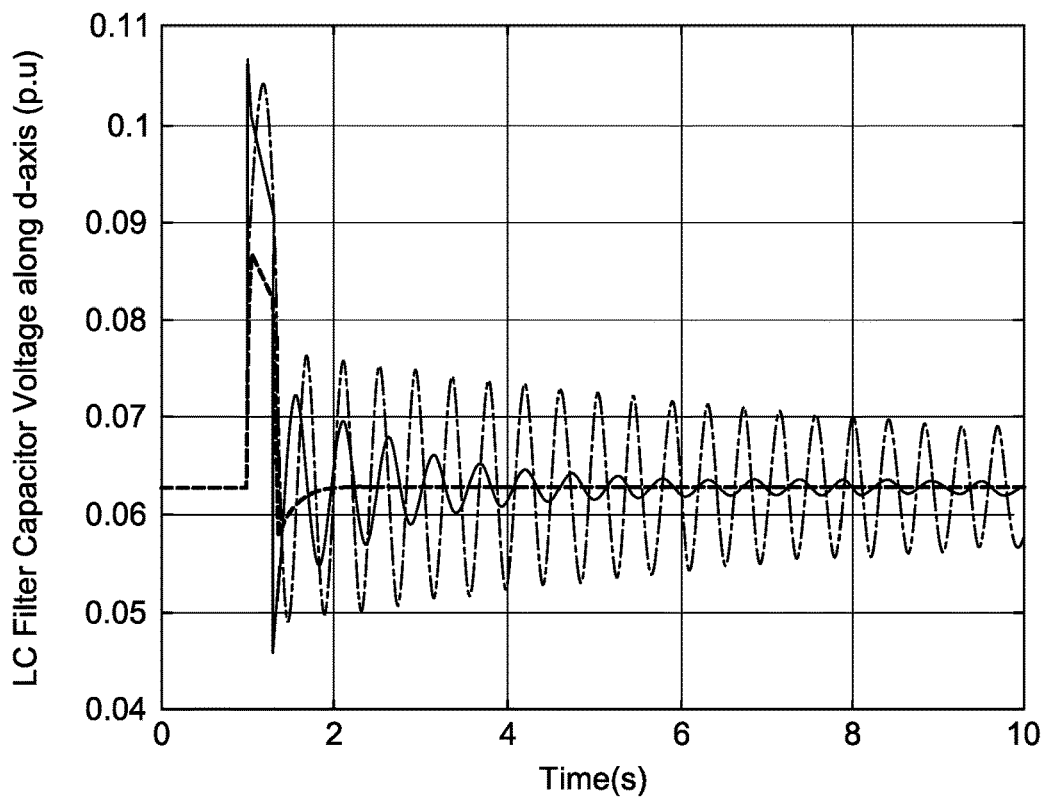
FIG. 23 is a graph illustrating a simulation result of dynamic response of a LC filter capacitor voltage along d-axis with action of the controller of the one embodiment, with action of the PID controller, and without action of controller.
Figure 24:
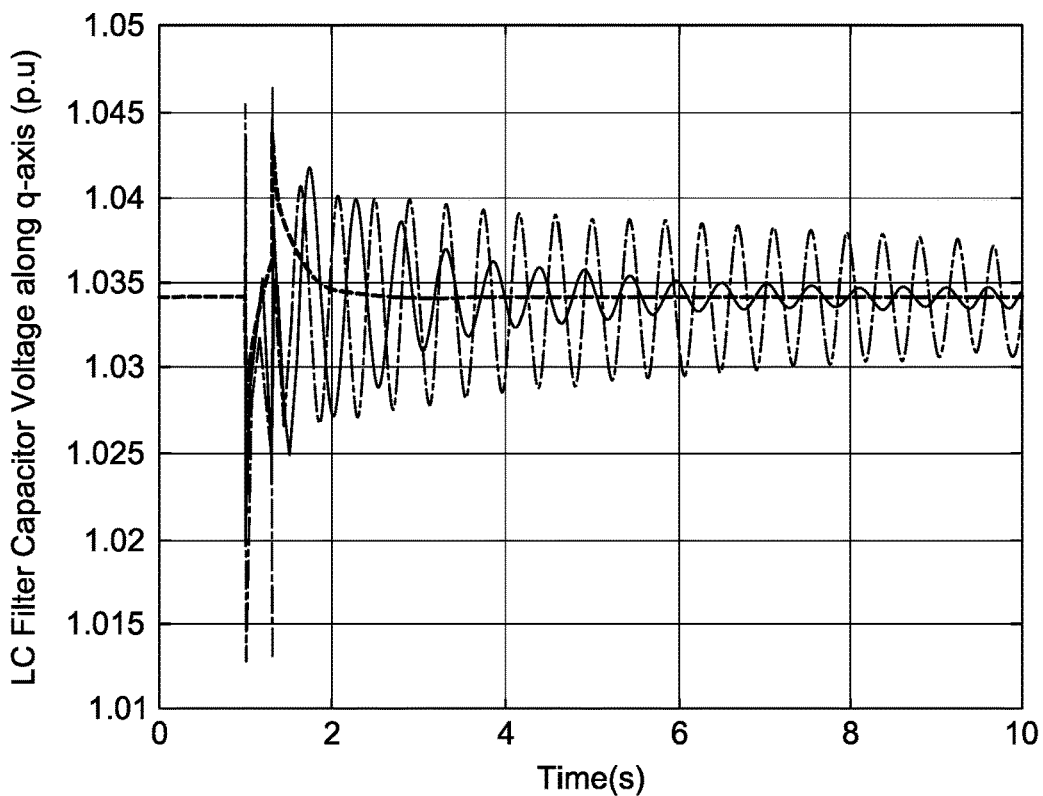
FIG. 24 is a graph illustrating a simulation result of dynamic response of a LC filter capacitor voltage along q-axis with action of the controller of the one embodiment, with action of the PID controller, and without action of controller.

FIG. 19 and FIG. 20 show simulation results of responses of the inverter output current along d-axis and the inverter output current along q-axis, respectively. It can be noticed from these figures that the uncontrolled case lead to continuous oscillations. However, the transient responses with the controller 240 of the present embodiment are improved, and the inverter output current along d-axis and the inverter output current along q-axis are restored to the steady-state condition in less than 1.5 seconds.

FIG. 21, FIG. 22, FIG. 23, and FIG. 24 show simulation results of transient responses of the LC filter output current along d-axis, the LC filter output current along q-axis, the LC filter capacitor voltage along d-axis, and the LC filter capacitor voltage along q-axis, respectively. It can be observed from these four figures that in the absence of the controller action, the oscillations in the LC filter output current along d-axis, the LC filter output current along q-axis, the LC filter capacitor voltage along d-axis, and the LC filter capacitor voltage along q-axis continue for a longer period of time. However, in the presence of action of the controller 240 of the present embodiment, the responses are enhanced, and the MG system 100 returns to the steady-state conditions in less than 1.5 seconds.

Figure 25:
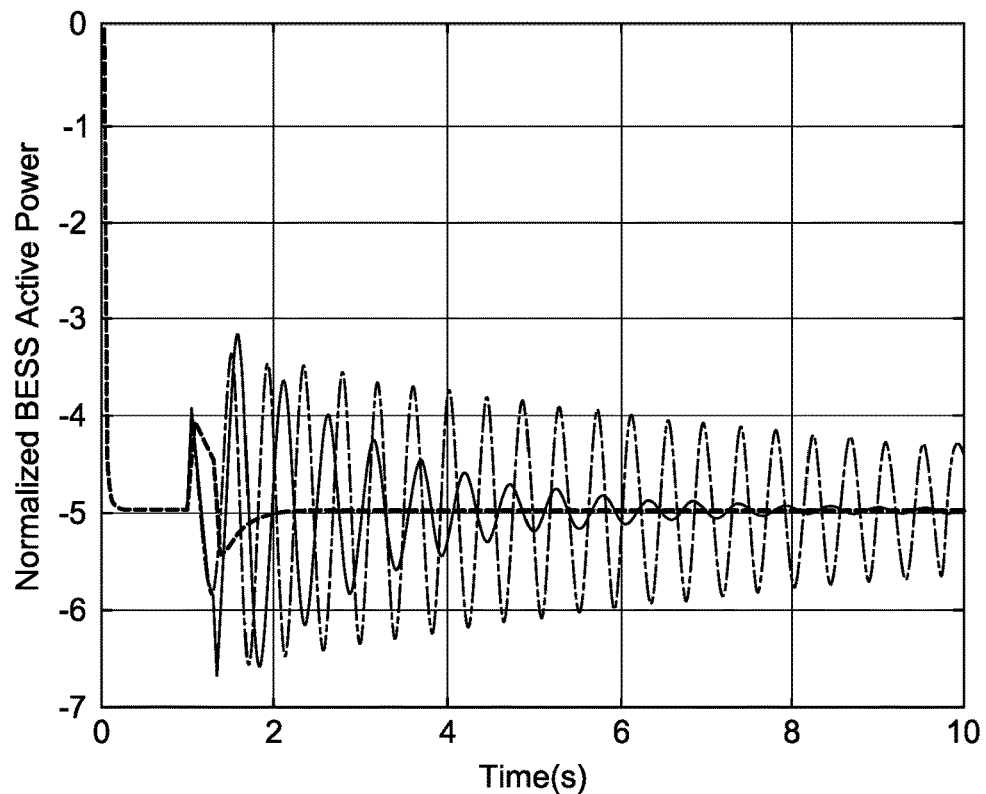
FIG. 25 is a graph illustrating a simulation result of dynamic response of an injected real power by the BESS with action of the controller of the one embodiment, with action of the PID controller, and without action of controller.
Figure 26:
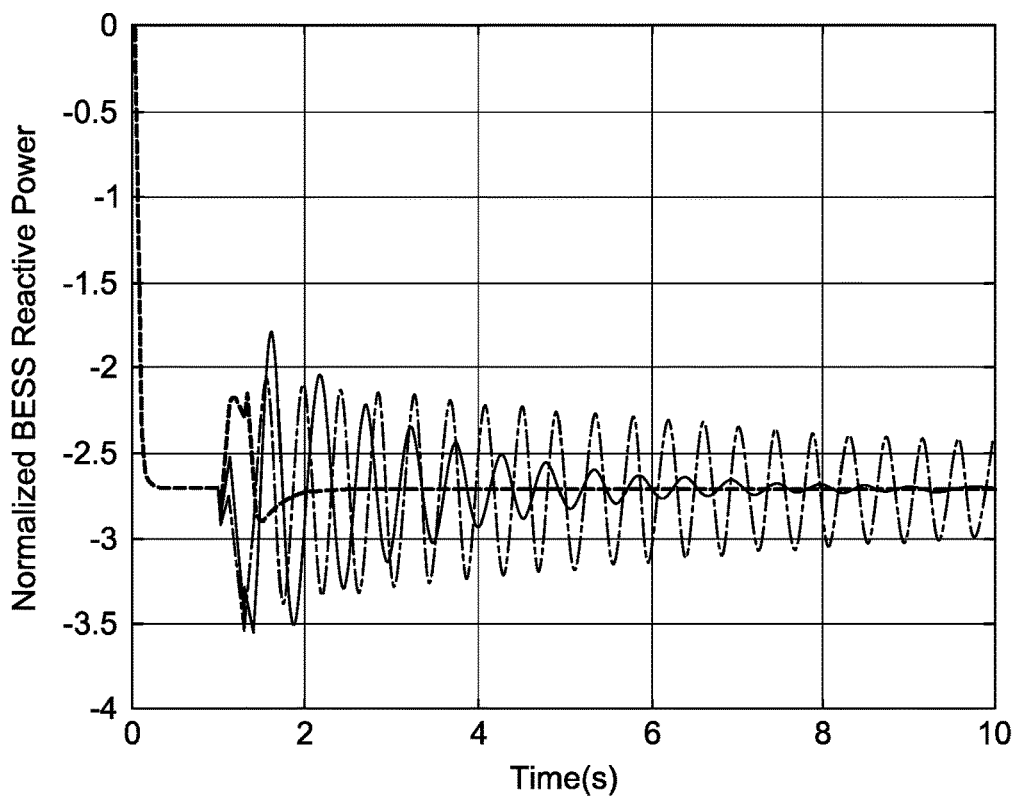
FIG. 26 is a graph illustrating a simulation result of dynamic response of an injected reactive power by the BESS with action of the controller of the one embodiment, with action of the PID controller, and without action of controller.

FIG. 25 and FIG. 26 show simulation results of performance of the BESS 230 during transients with and without the action of the controller 240 of the present embodiment. The BESS 230 behaves randomly without a proper controller and fluctuates for a long period of time. On the other hand, with the use of the controller 240 of the present embodiment, the BESS 230 restores the MG system 100 to steady-state conditions within 1 seconds.

As can be seen in FIG. 25, the sudden changes in the input mechanical torque of the DSG 210 are mitigated by the injection or absorption of real power by the BESS 230. This reduces the oscillations amplitude in various system quantities of the MG system 100, particularly the system frequency. Similarly, the variations of the voltage at the PCC bus 150 during contingencies are reduced by the injection or absorption of reactive power by the BESS 230 as shown in FIG. 26. The controller 240 of the present embodiment has successfully managed the active and reactive power flow from and to the BESS 230 in order to maintain the system frequency and the system voltage of the MG system 100 within the prescribed operating limits.

It can be observed from the foregoing simulation results illustrated in FIG. 13 to FIG. 26 that the controller 240 of the present embodiment performs better in terms of stabilization time and overshoot when compared with the benchmark PID controller in all given scenarios. Although there is a tradeoff between the stabilization time and overshoot, the controller 240 of the present embodiment is capable of keeping both the percentage of overshoot along with stabilization time to minimum level. According to the controller 240 of the present embodiment, the power quality of the MG system 100 is improved and steady state conditions are achieved within a shorter period of time after the occurrence of a disturbance. Hence the controller 240 of the present embodiment is suitable for online tuning of the controller parameters under the influence of unknown disturbances.

Figure 27:
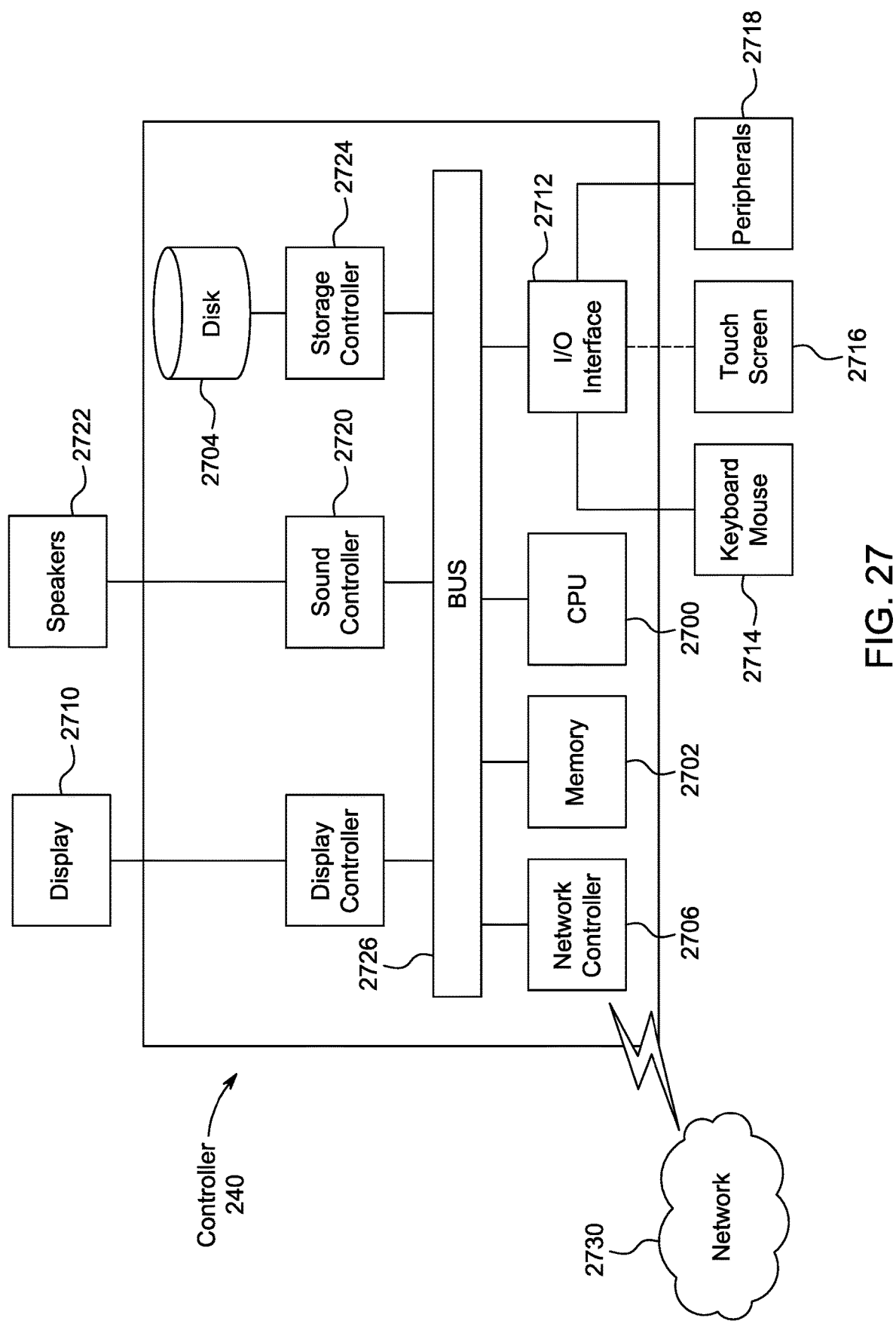
FIG. 27 is an exemplary hardware configuration of the controller according to certain embodiments.

Next, a hardware description of the controller 240 according to exemplary embodiments is described with reference to FIG. 27. In FIG. 27, the controller 240 includes a CPU 2700 which performs the processes described above. The process data and instructions may be stored in memory 2702. These processes and instructions may also be stored on a storage medium disk 2704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the controller 240 communicates, such as a server or computer.

Further, the claimed advancements may be provided as a utility application, background daemon, or component of an operating system, or combination thereof, executing in conjunction with CPU 2700 and an operating system such as Microsoft Windows 10, UNIX, Solaris, LINUX, Apple MAC-OS and other systems known to those skilled in the art.

CPU 2700 may be a Xenon or Core processor from Intel of America or an Opteron processor from AMD of America, or may be other processor types that would be recognized by one of ordinary skill in the art. Alternatively, the CPU 2700 may be implemented on an FPGA, ASIC, PLD or using discrete logic circuits, as one of ordinary skill in the art would recognize. Further, CPU 2700 may be implemented as multiple processors cooperatively working in parallel to perform the instructions of the inventive processes described above.

The controller 240 in FIG. 27 also includes a network controller 2706, such as an Intel Ethernet PRO network interface card from Intel Corporation of America, for interfacing with network 2730. As can be appreciated, the network 2730 can be a public network, such as the Internet, or a private network such as an LAN or WAN network, or any combination thereof and can also include PSTN or ISDN sub-networks. The network 2730 can also be wired, such as an Ethernet network, or can be wireless such as a cellular network including EDGE, 3G and 4G wireless cellular systems. The wireless network can also be WiFi, Bluetooth, or any other wireless form of communication that is known.

The controller 240 further includes a display controller 2708, such as a NVIDIA GeForce GTX or Quadro graphics adaptor from NVIDIA Corporation of America for interfacing with display 2710, such as a Hewlett Packard HPL2445w LCD monitor. A general purpose I/O interface 2712 interfaces with a keyboard and/or mouse 2714 as well as a touch screen panel 2716 on or separate from display 2710. General purpose I/O interface also connects to a variety of peripherals 2718 including printers and scanners, such as an OfficeJet or DeskJet from Hewlett Packard.

A sound controller 2720 is also provided in the controller 240, such as Sound Blaster X-Fi Titanium from Creative, to interface with speakers/microphone 2722 thereby providing sounds and/or music.

The general-purpose storage controller 2724 connects the storage medium disk 2704 with communication bus 2726, which may be an ISA, EISA, VESA, PCI, or similar, for interconnecting all of the components of the controller 240. A description of the general features and functionality of the display 2710, keyboard and/or mouse 2714, as well as the display controller 2708, storage controller 2724, network controller 2706, sound controller 2720, and general purpose I/O interface 2712 is omitted herein for brevity as these features are known.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A microgrid system, comprising:
a synchronous generator configured to convert mechanical power into electric power;
an energy storage system configured to store and supply electric power;
a controller configured to control operation of the energy storage system; and
a point of common coupling bus connecting the synchronous generator and the battery energy storage system, wherein
a controller parameter of the controller is determined based on a level of a disturbance using a trained artificial neural network (ANN) in response to occurrence of the disturbance in the synchronous generator, wherein
the controller includes a proportional-integral (PI) controller and a hybrid DEO-ANN unit,
the controller parameter is a controller parameter of the PI controller, and
the trained ANN is obtained by the hybrid DEO-ANN unit using differential evolution optimization (DEO) and subsequent ANN training with input and output patterns of the DEO,
the hybrid DEO-ANN unit includes a DEO module, an ANN module, and a data storage module,
the data storage module stores therein a mathematical model representing the microgrid system,
the DEO module acquires the mathematical model from the data storage module and obtains a plurality of optimized controller parameters of the PI controller by applying a plurality of levels of disturbances, which are input patterns of a DEO algorithm, to a part of the mathematical model corresponding to a mechanical part of the synchronous generator and optimizing, for each level of disturbance, the controller parameter of the PI controller using the DEO algorithm in such a manner as to restore a system frequency and a system voltage of the MG system to preset normal operating limits, and
the ANN module trains an ANN using the plurality of levels of disturbances as input and the plurality of optimized controller parameters as output and stores a trained ANN in the data storage module,
wherein
the energy storage system is a battery energy storage system (BESS) including a rechargeable battery and a voltage source converter, the voltage source converter performing a bidirectional conversion between DC voltage and AC voltage,
the controller compares a system frequency of the microgrid system to a preset reference frequency and determines mismatch between the system frequency and the preset reference to generate an error signal that is input into the PI controller, wherein the PI controller outputs a control signal based on the inputted error signal, and
the PI controller whose controller parameter is optimized controls the voltage source converter with the control signal through a modulation index and a phase angle, and in response to receiving the control signal, the BESS supplies or absorbs at least active power to perform quick damping of oscillations to minimize the mismatch in the microgrid system.

2. The microgrid system of claim 1, wherein the controller parameter of the PI controller is optimized in such a manner as to restore a system frequency and a system voltage of the microgrid system to preset normal operating limits at the level of a disturbance.

3. The microgrid system of claim 1, wherein the PI controller is connected to the hybrid DEO-ANN unit via a network.

4. The microgrid system of claim 1, wherein the mathematical model includes a plurality of non-linear differential equations mathematically representing the synchronous generator and the energy storage system.

5. The microgrid system of claim 1, wherein the controller parameter of the PI controller includes controller gains $K_p$ and $K_i$.

6. The microgrid system of claim 5, wherein the ANN includes an input layer with the plurality of levels of disturbances, a hidden layer with a plurality of neurons, and an output layer with two neurons for optimized controller gains Kp and Ki, a number of the neurons included in the hidden layer being equal to a number of the levels of disturbances in the input layer.

7. The microgrid system of claim 6, wherein in training the ANN, a backpropagation algorithm is used with a hyperbolic tangent activation function for the plurality of neurons in the hidden layer and a linear activation function for the two neurons in the output layer.

8. The microgrid system of claim 6, wherein the controller gains Kp and Ki are determined depending on a level of a disturbance in the synchronous generator using weighting matrices of the trained ANN.

9. The microgrid system of claim 1, wherein the synchronous generator is a diesel synchronous generator including a diesel engine and an electric generator.

10. The microgrid system of claim 9, further comprising:
a photovoltaic system including solar cells, a DC/DC boost converter, a DC/AC voltage source inverter, and a LC low pass filter, the photovoltaic system being connected to the battery energy storage system and the diesel synchronous generator via the point of common coupling bus.

11. A controller for controlling operation of a battery energy storage system included in a microgrid system including a diesel synchronous generator, the controller comprising:
a proportional-integral (PI) controller configured to control the battery energy storage system in such a manner as to minimize a mismatch between a system frequency of the microgrid system and a preset reference frequency; and
a hybrid DEO-ANN unit configured to obtain a trained artificial neural network (ANN) and determine a controller parameter of the PI controller based on a level of a disturbance using the trained ANN in response to occurrence of the disturbance in the diesel synchronous generator,
wherein the trained ANN is obtained by the hybrid DEO-ANN unit using differential evolution optimization (DEO) and subsequent ANN training with input and output patterns of the DEO,
the hybrid DEO-ANN unit includes a DEO module, an ANN module, and a data storage module,
the data storage module stores therein a mathematical model representing the microgrid system,
the DEO module acquires the mathematical model from the data storage module and obtains a plurality of optimized controller parameters of the PI controller by applying a plurality of levels of disturbances, which are input patterns of a DEO algorithm, to a part of the mathematical model corresponding to a mechanical part of the synchronous generator and optimizing, for each level of disturbance, the controller parameter of the PI controller using the DEO algorithm in such a manner as to restore a system frequency and a system voltage of the MG system to preset normal operating limits, and
the ANN module trains an ANN using the plurality of levels of disturbances as input and the plurality of optimized controller parameters as output and stores a trained ANN in the data storage module,
wherein
the energy storage system is a battery energy storage system (BESS) including a rechargeable battery and a voltage source converter, the voltage source converter performing a bidirectional conversion between DC voltage and AC voltage,
the controller compares a system frequency of the microgrid system to a preset reference frequency and determines mismatch between the system frequency and the preset reference to generate an error signal that is input into the PI controller, wherein the PI controller outputs a control signal based on the inputted error signal, and
the PI controller whose controller parameter is optimized controls the voltage source converter with the control signal through a modulation index and a phase angle, and in response to receiving the control signal, the BESS supplies or absorbs at least active power to perform quick damping of oscillations to minimize the mismatch in the microgrid system.

12. The controller of claim 11, wherein
the microgrid system further includes a photovoltaic system, and
the mathematical model includes a plurality of non-linear differential equations mathematically representing the synchronous generator, the energy storage system, and the photovoltaic system.

13. A method for controlling operation of a battery energy storage system using a controller, the battery energy storage system being included in a microgrid system including a diesel synchronous generator, the method comprising:
acquiring a mathematical model representing the microgrid system;
applying a plurality of levels of disturbances to a part of the mathematical model corresponding to a mechanical part of the diesel synchronous generator;
optimizing, for each level of disturbance, a controller parameter of the PI controller using differential evolution optimization in such a manner as to restore a system frequency and a system voltage of the MG system to preset normal operating limits;
training an artificial neural network (ANN) using the plurality of levels of disturbances as input and a plurality of optimized controller parameters as output, each level of disturbance corresponding to each optimized controller parameter; and
determining a value of the controller parameter based on a level of a disturbance using a trained ANN in response to occurrence of the disturbance in the diesel synchronous generator,
wherein
the controller includes a proportional-integral (PI) controller and a hybrid DEO-ANN unit,
the controller parameter is a controller parameter of the PI controller, and
the trained ANN is obtained by the hybrid DEO-ANN unit using differential evolution optimization (DEO) and subsequent ANN training with input and output patterns of the DEO,
the hybrid DEO-ANN unit includes a DEO module, an ANN module, and a data storage module,
the data storage module stores therein a mathematical model representing the microgrid system,
the DEO module acquires the mathematical model from the data storage module and obtains a plurality of optimized controller parameters of the PI controller by applying a plurality of levels of disturbances, which are input patterns of a DEO algorithm, to a part of the mathematical model corresponding to a mechanical part of the synchronous generator and optimizing, for each level of disturbance, the controller parameter of the PI controller using the DEO algorithm in such a manner as to restore a system frequency and a system voltage of the MG system to preset normal operating limits, and the ANN module trains an ANN using the plurality of levels of disturbances as input and the plurality of optimized controller parameters as output and stores a trained ANN in the data storage module, wherein the energy storage system is a battery energy storage system (BESS) including a rechargeable battery and a voltage source converter, the voltage source converter performing a bidirectional conversion between DC voltage and AC voltage, the controller compares a system frequency of the microgrid system to a preset reference frequency and determines mismatch between the system frequency and the preset reference to generate an error signal that is input into the PI controller, wherein the PI controller outputs a control signal based on the inputted error signal, and the PI controller whose controller parameter is optimized controls the voltage source converter with the control signal through a modulation index and a phase angle, and in response to receiving the control signal, the BESS supplies or absorbs at least active power to perform quick damping of oscillations to minimize the mismatch in the microgrid system.

* * * * *